US008174465B2

(12) United States Patent
Takagi et al.

(10) Patent No.: US 8,174,465 B2
(45) Date of Patent: May 8, 2012

(54) STEREOSCOPIC IMAGE DISPLAY APPARATUS

(75) Inventors: Ayako Takagi, Yokosuka (JP); Shunichi Numazaki, Tokyo (JP); Hitoshi Kobayashi, Kawasaki (JP); Tatsuo Saishu, Tokyo (JP); Yuzo Hirayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 420 days.

(21) Appl. No.: 12/560,325

(22) Filed: Sep. 15, 2009

(65) Prior Publication Data

US 2010/0073347 A1    Mar. 25, 2010

(30) Foreign Application Priority Data

Sep. 24, 2008 (JP) ................................. 2008-243915

(51) Int. Cl.
*G09G 5/00* (2006.01)
(52) U.S. Cl. ................ 345/6; 345/15; 345/211; 348/51; 348/58; 348/E13.044; 359/462
(58) Field of Classification Search .......................... None
See application file for complete search history.

(56) References Cited

U.S. PATENT DOCUMENTS

| 7,250,923 B2* | 7/2007 | Taira et al. ........................ 345/6 |
| 7,426,068 B2* | 9/2008 | Woodgate et al. ............ 359/237 |
| 2006/0256259 A1 | 11/2006 | Takagi et al. |

OTHER PUBLICATIONS

Yoshino et al.; "The Foundation of Liquid Crystal and Display Application", Corona Publishing Co., Ltd., pp. 114-132.
Kaneko et al.; "Full-Color STN Video LCDS", Eurodisplay '09 Digest, pp. 100-103, (1990).
Yoshino et al., "The Foundation of Liquid Crystal and Display Application," Corona Publishing Co., Ltd., May 20, 1994, pp. 114-132.

* cited by examiner

*Primary Examiner* — Jason Olson
(74) *Attorney, Agent, or Firm* — Finnegan, Henderson, Farabow, Garrett & Dunner, L.L.P.

(57) ABSTRACT

It is made possible to prevent luminance falling and moire occurrence and change over between a two-dimensional image and a three-dimensional image partially. When displaying one of a three-dimensional image and a two-dimensional image on a background and displaying the other image in a window, a flag bit indicating whether the first and second electrodes overlap the window is set. Waveforms differing according to the flag bit are applied to the first and second electrodes as pulses applied to the opposed first and second electrodes of a variable polarization cell. As a result, three-dimensional image display is partially conducted in the window and two-dimensional image display is conducted in areas other than the window. Or two-dimensional image display is partially conducted in the window and three-dimensional image display is conducted in areas other than the window.

8 Claims, 18 Drawing Sheets

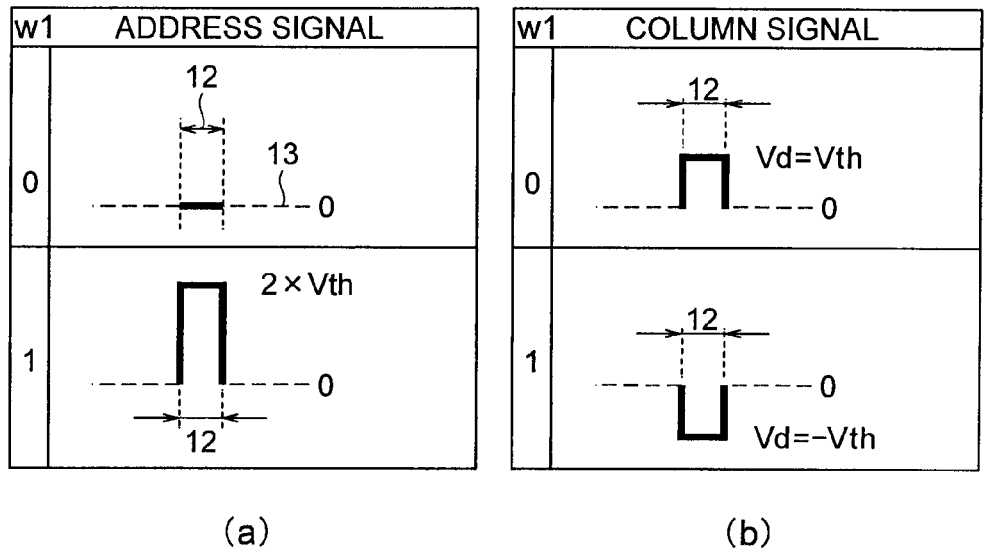

| ADDRESS w1 | ADDRESS w2 | COLUMN w1 | COLUMN w2 | 3D DISPLAY _w1 | 3D DISPLAY _w2 | VOLTAGE VALUE APPLIED TO LIQUID CRYSTAL | 3D DISPLAY |
|---|---|---|---|---|---|---|---|
| IN 1, OUT 0 | IN 1, OUT 0 | IN 1, OUT 0 | IN 1, OUT 0 | DESIGN VALUE | | | |
| 0 | 0 | 0 | 0 | OFF | OFF | 1.8 | OFF |
| 0 | 0 | 1 | 0 | OFF | OFF | 1.8 | OFF |
| 0 | 0 | 0 | 1 | OFF | OFF | 1.8 | OFF |
| 0 | 0 | 1 | 1 | OFF | OFF | 1.8 | OFF |
| 0 | 1 | 0 | 0 | OFF | OFF | 1.8 | OFF |
| 0 | 1 | 1 | 0 | OFF | OFF | 1.8 | OFF |
| 0 | 1 | 0 | 1 | OFF | ON | 4.02 | ON |
| 0 | 1 | 1 | 1 | OFF | ON | 4.02 | ON |
| 1 | 0 | 0 | 0 | ON | OFF | 1.8 | OFF |
| 1 | 0 | 1 | 0 | ON | OFF | 4.02 | ON |
| 1 | 0 | 0 | 1 | OFF | OFF | 1.8 | OFF |
| 1 | 0 | 1 | 1 | ON | OFF | 4.02 | ON |
| 1 | 1 | 0 | 0 | OFF | OFF | 1.8 | OFF |
| 1 | 1 | 1 | 0 | ON | ON | 4.02 | ON |
| 1 | 1 | 0 | 1 | OFF | ON | 1.8 | OFF |
| 1 | 1 | 1 | 1 | ON | ON | 1.8 | ON |

FIG. 16

| w1 | w2 | w1 | w2 | w1 | w2 | VOLTAGE APPLIED TO LIQUID CRYSTAL | 3D DISPLAY |
|---|---|---|---|---|---|---|---|
| 0 | 0 | 0 | 0 | OFF | OFF | 1.8 | OFF |
| 0 | 0 | 1 | 0 | ON | OFF | 1.8 | OFF |
| 0 | 0 | 0 | 1 | OFF | ON | 1.8 | OFF |
| 0 | 0 | 1 | 1 | ON | ON | 4.2 | ON |
| 0 | 1 | 0 | 0 | OFF | ON | 1.8 | OFF |
| 0 | 1 | 1 | 0 | ON | ON | 4.02 | ON |
| 0 | 1 | 0 | 1 | OFF | ON | 1.8 | OFF |
| 0 | 1 | 1 | 1 | ON | ON | 4.02 | ON |
| 1 | 0 | 0 | 0 | ON | OFF | 1.8 | OFF |
| 1 | 0 | 1 | 0 | ON | OFF | 1.8 | OFF |
| 1 | 0 | 0 | 1 | ON | ON | 4.02 | ON |
| 1 | 0 | 1 | 1 | ON | ON | 4.02 | ON |
| 1 | 1 | 0 | 0 | ON | ON | 4.2 | ON |
| 1 | 1 | 1 | 0 | ON | ON | 6.26 | ON |
| 1 | 1 | 0 | 1 | ON | ON | 6.26 | ON |
| 1 | 1 | 1 | 1 | ON | ON | 10.2 | ON |

FIG. 18

| TRANSITION REGION VOLTAGE WIDTH [V] | Vth THRESHOLD VALUE [V] | n THE NUMBER OF SCANNING LINES | D DATA SIGNAL VOLTAGE [V] | A ADDRESS SIGNAL VOLTAGE [V] | ON AVERAGE VOLTAGE RATIO | OFF AVERAGE VOLTAGE | CONTRAST RATIO | P OPERATION MARGIN | MAXIMUM NUMBER OF SCANNING LINES Nmax | A−D |
|---|---|---|---|---|---|---|---|---|---|---|
| 1.9 | 1.8 | 2 | 2.35 | 3.33 | 4.35 | 1.80 | 2.41421 | 1.056 | 2.62471 | 0.974153 =○ |
| 1.9 | 1.8 | 3 | 1.96 | 3.39 | 3.48 | 1.80 | 1.93185 | | | 1.433205 =○ |
| 1.9 | 1.8 | 4 | 1.80 | 3.60 | 3.12 | 1.80 | 1.73205 | | | 1.8 =○ |

FIG. 25

STEREOSCOPIC IMAGE DISPLAY APPARATUS

CROSS-REFERENCE TO RELATED APPLICATION

This application is based upon and claims the benefit of priority from prior Japanese Patent Application No. 2008-243915 filed on Sep. 24, 2008 in Japan, the entire contents of which are incorporated herein by reference.

BACKGROUND OF THE INVENTION

1. Field of the Invention

The present invention relates to a stereoscopic image display apparatus capable of displaying one of a two-dimensional image and a three-dimensional image partially when the other of the two-dimensional image and the three-dimensional image is being displayed.

2. Related Art

A method of recording a stereoscopic image by using some method and reproducing it as a stereoscopic image is known. This method is called integral photography (hereafter referred to as IP method) for displaying a number of parallax images or light ray reproduction method. It is supposed that an object is viewed with left and right eyes. When a point A located at a short distance is viewed, an angle formed by the point A and the left and right eyes is denoted by $\alpha$. When a point B located at a long distance is viewed, an angle formed by the point B and the left and right eyes is denoted by $\beta$. The angles $\alpha$ and $\beta$ vary depending upon the position relation between the object and the viewer. The difference ($\alpha-\beta$) is called binocular parallax. Human being is sensitive to the binocular parallax and is able to conduct stereoscopic viewing.

In recent years, development of stereoscopic image display apparatuses without glasses has been promoted. Many of them use the ordinary two-dimensional plane display device. Many of them are made possible by placing some optical plate on the front or back of the plane display device, utilizing the binocular parallax described above, and controlling angles of light rays from the plane display device so as to cause light rays to appear to be illuminated from objects located several cm before and behind the plane display device when viewed by a viewer. This is because it has become possible to obtain an image which is high in definition to some degree even if light rays of the plane display device are distributed to several kinds of angles (called parallaxes), owing to implementation of the plane display device having a higher definition.

A three-dimensional (hereafter referred to as 3D as well) display method implemented by thus applying the IP method to a stereoscopic image display device is called integral imaging (II) scheme. In the II scheme, the number of light rays illuminated from one lens corresponds to the number of element image groups. The number of the element image groups is typically called number of parallaxes. In each lens, parallax rays are illuminated in parallel. In the II scheme, the viewer views different images: an image of 1 parallax, an image of 2 parallaxes, and an image of 3 parallaxes, according to the position of the viewer or the angle at which the viewer views.

Therefore, the viewer perceives a solid body by parallax between the right eye and the left eye. If a lenticular lens is used as the optical plate, there is a merit that the display is bright because the utilization efficiency of light is high as compared with a slit. As for a gap between the lens array and pixels, it is desirable to provide a distance which is nearly equal to the focal length. By doing so, one pixel can be illuminated in one direction and parallax images which differ according to the viewing angle can be viewed.

The best-known substance having a double refraction property is calcite. As an optical application of the double refraction, there is a drawn film used for the retardation film. Specifically, ARTON (JSR Corporation) and polycarbonate (Nitto Denko Corporation) are well known.

Furthermore, liquid crystal also has the double refraction property. In the liquid crystal, each molecule takes a long and slender shape. Anisotropy of the refractive index occurs in a lengthwise direction of the molecule called director. For example, many of molecules in nematic liquid crystal are long and slender molecules. Their major axis directions are aligned and oriented. However, position relations of the molecules are random. Even if the orientation directions of molecules are in alignment, the absolute temperature of ambience in use is not zero degree, and consequently they are not perfectly parallel and there is fluctuation (represented by an order parameter S) to some degree. Viewing a local region, however, it can be said that molecules are aligned in nearly one direction. When a region which is small enough macroscopically but large enough as compared with the size of the liquid crystal molecules is supposed, the average orientation direction of the molecules in that region is represented by using a unit vector n, and it is referred to as director or orientation vector. An orientation in which the director becomes nearly parallel to the substrate is referred to as homogeneous orientation. One of the greatest features of liquid crystal is optical anisotropy. Especially, since the degree of freedom in the molecule arrangement is high as compared with other anisotropic media such as crystal, the difference in refractive index between the major axis and the minor axis which is a criterion of double refraction is great.

In simple matrix drive which is one of drive schemes for driving the liquid crystal, a configuration obtained by interposing a liquid crystal layer between row electrodes Xn arranged in one column and column electrodes Ym is used. The liquid crystal is activated by selectively applying a voltage to a part (pixels) where these electrodes intersect. In this drive method, electrodes are formed of transparent electrodes and a transistor which individually controls ON-OFF is not provided in each pixel. Therefore, there are no black matrixes for hiding wires. This results in a merit that the luminance can be made bright.

In active matrix drive which is another drive scheme for driving the liquid crystal, the electro-optic effect itself of the liquid crystal is provided with a memory property. For example, if a voltage is applied stationarily over a frame period once changeover from the ON state to the OFF state is performed, then high definition display becomes possible in principle even when the display capacity is increased remarkably. As an element having such a memory property, there is an active element such as a transistor or a diode. In the configuration according to the active matrix scheme, the active element is added to each pixel. A merit of this active matrix scheme is that polarization changeover which is free from the concern about crosstalk, which is high in definition and which does not depend upon the wavelength is possible (see "The foundation of liquid crystal and display application" written by Y. Yoshino and M. Ozaki published by CORONA PUBLISHING CO., LTD.)

A method for suppressing the frame response is reducing the potential difference between a selection pulse and a non-selection pulse in the simple matrix drive. As a method for shortening the selection pulse interval without making the pulse width small, there is a multi-line selection (MLS).

According to the MLS, a plurality of scanning lines is selected simultaneously unlike the conventional line sequential scanning (see Y. Kaneko, et al. "Full Color STN Video LCDs," Eurodisplay '90 Digest, p. 100, 1990).

In the stereoscopic image display apparatus, image information of the plane display device disposed on the back of the optical plate is assigned to respective parallax images. Therefore, the resolution falls as compared with the original plane display device disposed on the back. Therefore, a function capable of changing over between high definition two-dimensional image display and three-dimensional image display providing a stereoscopic sense in the same stereoscopic display apparatus is desired. In addition, there is also a strong demand for a function of providing the high definition two-dimensional image display and the three-dimensional image display on the same display plane, i.e., a function capable of changing over between a two-dimensional image and a three-dimensional image partially. For implementing changeover between the two-dimensional image and the three-dimensional image partially, it can provide variable polarization cells, divide electrodes for applying a voltage to liquid crystal of the variable polarization cells by X coordinates and Y coordinates, and apply individual voltages to respective areas.

Drive methods for variable polarization cells can be broadly classified into the following three kinds.

(1) Segment drive
(2) Simple matrix drive
(3) Active matrix drive

The segment drive in (1) is a drive method frequently used in watches and electronic calculators. Individual display parts (optical switches) are formed of independent electrodes. If matrix drive is conducted, display disturbance is caused in the display part by wiring. Therefore, the segment drive in (1) is not suitable for the drive method of conducting the changeover between the two-dimensional image and the three-dimensional image partially.

In the simple matrix drive in (2), matrix drive can be conducted as described above. However, signals input to the same row and the same column are applied in the same way. Therefore, it is necessary to apply a voltage of at least a threshold to a pixel only when the pixel is selected and suppress the voltage to the threshold or below when the pixel is not selected. As the resolution (i.e., the number of address lines in the vertical direction) of the variable polarization cells becomes large, the ratio between a voltage applied to liquid crystal when the pixel is selected and that when the pixel is not selected approaches unity and consequently the selection ratio between the two-dimensional image display mode and the three-dimensional image display mode becomes small. A concrete degradation phenomenon is that noise is mixed in the far-side or near-side display at the time of a three-dimensional image display mode because a two-dimensional image display mode is mixed and the directivity of light rays is degraded. If Twisted Nematic (TN) liquid crystal obtained by twisting nematic liquid crystal by 90 degrees is used in the simple matrix drive, then the threshold characteristics cannot be made sufficiently steep, resulting in a problem that the number of addresses is limited.

If Super Twisted Nematic (STN) having a twist angle of approximately 270 degrees and steep threshold characteristics is used instead of TN liquid crystal, therefore, the contrast can be maintained even when the voltage ratio approaches unity. Since the STN liquid crystal has great dependence of polarization characteristics upon the wavelength, however, it is necessary to use a film which compensates the wavelength dependence at the time of use and complicated optical design and a retardation film material become necessary.

In the active matrix drive in (3), each pixel is driven individually in one frame section as described above. Therefore, it is possible to use TN liquid crystal. As demerits, however, it can be mentioned that the aperture ratio caused by the black matrix falls (i.e. the luminance falls) and moire is caused by interference between a black matrix of variable polarization cells and a black matrix of an LCD for display pixel. Furthermore, complication of the manufacture process and a cost increase caused by the manufacture process of the Thin Film Transistor (TFT) can be mentioned.

SUMMARY OF THE INVENTION

The present invention has been made in view of these circumstances, and an object of thereof is to provide a drive method for a stereoscopic image display apparatus having a function capable of preventing luminance falling and moire occurrence and changing over between a two-dimensional image and a three-dimensional image partially.

According to an aspect of the present invention, there is provided a drive method for a stereoscopic image display apparatus, the stereoscopic image display apparatus including: a plane display device having a plurality of pixels arranged on a display face; a variable polarization cell provided in front of the plane display device, the variable polarization cell including a first electrode substrate having n (where $n \geq 1$) transparent first electrodes arranged in parallel thereon, a second electrode substrate having m (where $m \geq 1$) transparent second electrodes arranged in a direction substantially perpendicular to the direction in which the first electrodes are arranged, and liquid crystal sandwiched between the first electrode substrate and the second electrode substrate, wherein a polarization direction of light rays from the plane display device is made variable according to a voltage applied between the first and second electrode substrates; and an optical plate provided on an opposite side of the variable polarization cell from the plane display device, the optical plate including a transparent substrate, a lens substrate having a plurality of cylindrical lenses arranged thereon so as to have major axes in the same direction, and a double refraction substance inserted between the transparent substrate and the lens substrate, wherein a major axis direction of the double refraction substance is substantially parallel to major axis directions of lenses of the lens substrate, a minor axis direction of the double refraction substance is substantially perpendicular to the major axis directions of the lenses of the lens substrate, and light rays from the pixels obtained via the variable polarization cell are assigned to predetermined angles, the stereoscopic image display apparatus being capable of changing over between a three-dimensional image and a two-dimensional image and displaying the image, when displaying the three-dimensional image and the two-dimensional image in a background and a window on a same display plane, the background with one of the three-dimensional image and the two-dimensional image and displaying a first to pth (where $p \geq 1$) windows with the other image, the drive method comprising: setting an ith flag bit (where $1 \leq i \leq p$) concerning the first electrodes and indicating whether an ith window overlaps the first electrodes, and setting an ith flag bit concerning the second electrodes and indicating whether the ith window overlaps the second electrodes; dividing one frame period of the plane display device into p sections as first and second pulses of voltage to be applied respectively to the first and second electrodes, preparing waveforms of $2^p$ kinds which differ in at least one value of the first and second pulses in the section obtained by the division, and associating the waveforms with a set of values of the first to pth flag bits concerning the first and second electrodes; selecting one first electrode and one second electrode respectively from the n first electrodes and the m second electrodes; and applying the first and second pulses associated with the set of values of the first to pth flag bits concerning the selected first and second electrodes to the selected first and second electrodes.

According to an aspect of the present invention, there is provided a drive method for a stereoscopic image display apparatus, the stereoscopic image display apparatus including: a plane display device having a plurality of pixels arranged on a display face; a variable polarization cell provided in front of the plane display device, the variable polarization cell including a first electrode substrate having n (where $p \geq 1$) transparent first electrodes arranged in parallel thereon, a second electrode substrate having m (where $m \geq 1$) transparent second electrodes arranged in a direction substantially perpendicular to the direction in which the first electrodes are arranged, and TN liquid crystal sandwiched between the first electrode substrate and the second electrode substrate, wherein a polarization direction of light rays from the plane display device is made variable according to a voltage applied between the first and second electrode substrates; and an optical plate provided on an opposite side of the variable polarization cell from the plane display device, the optical plate including a transparent substrate, a lens substrate having a plurality of cylindrical lenses arranged thereon so as to have major axes in the same direction, and a double refraction substance inserted between the transparent substrate and the lens substrate, wherein a major axis direction of the double refraction substance is substantially parallel to major axis directions of lenses of the lens substrate, a minor axis direction of the double refraction substance is substantially perpendicular to the major axis directions of the lenses of the lens substrate, and light rays from the pixels obtained via the variable polarization cell are assigned to predetermined angles, the stereoscopic image display apparatus being capable of changing over between a three-dimensional image and a two-dimensional image and displaying the image, when displaying the three-dimensional image and the two-dimensional image in a background and a window on a same display plane, the background with one of the three-dimensional image and the two-dimensional image and displaying a first to pth (where $p \geq 1$) windows with the other image, the drive method comprising: dividing one frame period of the plane display device into (p+1) sections, applying a pulse of a voltage Va (where Va>0) to all first electrodes which overlap the kth window as a first pulse to be applied to the first electrodes in the kth section (where $1 \leq k \leq p$) in the first to (p+1)th sections obtained by the division, applying a pulse of a voltage −Vd (where Vd>0) to all second electrodes which overlap the kth window as a second pulse to be applied to the second electrodes in the kth section, applying a pulse of a maximum voltage Va to the first electrodes which do not overlap any window as a first pulse in the (p+1)th section, and applying a pulse of a voltage Vd to the second electrodes which do not overlap any window as a second pulse in the (p+1)th section.

BRIEF DESCRIPTION OF THE DRAWINGS

FIG. 11 is a diagram showing relations among address bit information, column bit information and three-dimensional image display in the first embodiment;

FIGS. 12(a) and (b) are drive waveform diagrams in the first embodiment;

FIG. 13 is a diagram showing relations among address bit information, column bit information and three-dimensional image display in the first embodiment;

FIG. 16 is a diagram showing relations between drive waveforms applied to lines and columns and a display mode in the first embodiment;

FIG. 18 is a diagram showing relations between drive waveforms applied to lines and columns and a display mode in the first embodiment;

FIG. 25 is a diagram showing maximum voltage values of drive waveforms applied to lines and columns in the second embodiment;

DETAILED DESCRIPTION OF THE EMBODIMENTS

Hereafter, embodiments of the present invention will be described with reference to the drawings.

First Embodiment

Figure 1:
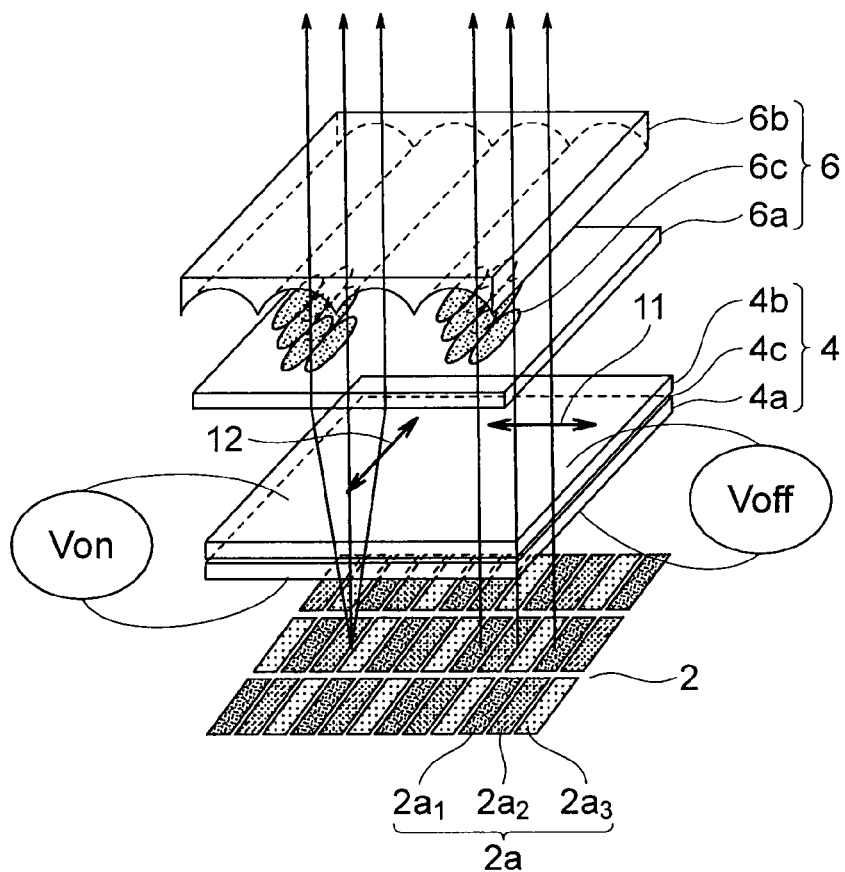
FIG. 1 is an oblique view showing a stereoscopic image display apparatus to which drive methods according to embodiments are applied.

A drive method for a stereoscopic image display apparatus according to a first embodiment of the present invention will now be described. A schematic configuration of the stereoscopic image display apparatus driven by using the drive method according to the present method is shown in FIG. 1. The stereoscopic image display apparatus according to the present embodiment includes a plane display device 2 which is, for example, a liquid crystal display device, a variable polarization cell 4 provided in front of the plane display device 2, and an optical plate 6 provided on the opposite side of the variable polarization cell 4 from the plane display device 2.

The plane display device includes a display face formed by arranging pixels 2a each having R (red), G (green) and B (blue) subpixels $2a_1$, $2a_2$ and $2a_3$ in a matrix form. The variable polarization cell 4 is provided in front of the display face. The variable polarization cell 4 includes transparent electrode substrates 4a and 4b which are opposed to each other. For example, TN (Twisted Nematic) liquid crystal is sandwiched between the electrode substrates 4a and 4b. Light illuminated from a pixel of the plane display device 2 is changed in polarization direction by changing a voltage applied between the electrode substrates 4a and 4b.

The optical plate 6 includes a flat transparent substrate 6a provided on the variable polarization cell 4 side, a lens substrate 6b which covers the transparent substrate 6a, and a double refraction substance 6c stored in a region surrounded by the substrate 6a and the lens substrate 6b. A plurality of cylindrical lenses each having a major axis which is nearly perpendicular to a longitudinal arrangement direction of the pixels 2a of the plane display device 2 are formed in parallel on the lens substrate 6b. In other words, the substrate 6a and the lens substrate 6b constitute lens frames, and the double refraction substance 6c is stored in the lens frames 6a and 6b. Furthermore, a major axis direction of the double refraction substance 6c is nearly parallel to the major axis direction of the lenses of the lens substrate 6b, and a minor axis direction of the double refraction substance 6c is nearly perpendicular to a major axis direction of each lens of the lens substrate 6b. A refractive index of the double refraction substance 6c in the major axis direction is higher than that in the minor axis direction. Furthermore, the lens frames 6a and 6b have an isotropic refractive index, and it is set so as to be nearly equal to the refractive index of the double refraction substance 6c in the minor axis direction. And the optical plate 6 assigns light rays from pixels of the plane display device 2 to predetermined angles.

In the drive method according to the present embodiment, changeover between a two-dimensional image and a three-dimensional image is conducted partially by using the stereoscopic image display apparatus having such a configuration when displaying the three-dimensional image and the two-dimensional image on the same display plane. Hereafter, the method of conducting changeover between a two-dimensional image and a three-dimensional image partially will be described.

The variable polarization cell 4 is brought into a three-dimensional image display mode without rotating the light polarization direction by using TN liquid crystal as the liquid crystal 4c and applying a saturation voltage Von between the electrode substrates 4a and 4b. By applying a voltage Voff, the polarization direction of light is rotated by 90 degrees and the variable polarization cell 4 is brought into a two-dimensional image display mode.

In the two-dimensional image display mode, the variable polarization cell 4 conducts adjustment so as to make the polarization direction (a direction of an arrow 11) coincide with minor axis direction of the double refraction substance 6c sandwiched between the substrate 6a and the lens substrate 6b. And the refractive index of the lens frames 6a and 6b is isotropic, and set so as to become nearly equal to the refractive index of the double refraction substance 6c in the minor axis direction. As a result, light is not bent at an interface between the variable polarization cell 4 and the optical plate 6, and the high definition two-dimensional image on the plane display device 2 located on the back can be viewed as it is.

On the other hand, in the three-dimensional image display mode, the variable polarization cell 4 conducts adjustment so as to cause a polarization direction (a direction of an arrow 12) to coincide with the major axis direction of the double refraction substance 6c. And the refractive index of the double refraction substance 6c in the major axis direction is higher than the refractive index of the lens frames 6a and 6b. As a result, light is refracted at the interface between the variable polarization cell 4 and the optical plate 6 and a lens effect appears. Since light from each pixel of the plane display device 2 is expanded and illuminated to the whole of the lens face in a direction according to each position, a three-dimensional image having directivity can be viewed.

Restriction conditions concerning the polarization selection ratio will now be described. As actually measured values which are nearly proportional to the polarization selection ratio, a V (voltage)-T (transmittance) curve representing voltage dependence at a luminance obtained when TN liquid crystal sandwiched by the transparent substrate is placed between sheet polarizers which differ from each other in polarization direction by 90 degrees is known. A rise state of liquid crystal of the variable polarization cell 4 can be known from the V-T curve in the case of normally white. In other words, when no voltage is applied, molecules do not move at all at the substrate interface. Even if a voltage which is a certain threshold voltage or below is applied under a condition that strong anchoring exists, orientation does not change at all. If a voltage greater than the threshold voltage is applied, then the director of the liquid crystal begins to rise gradually. If almost all liquid crystal rises, the orientation becomes unchanged.

Figure 2:
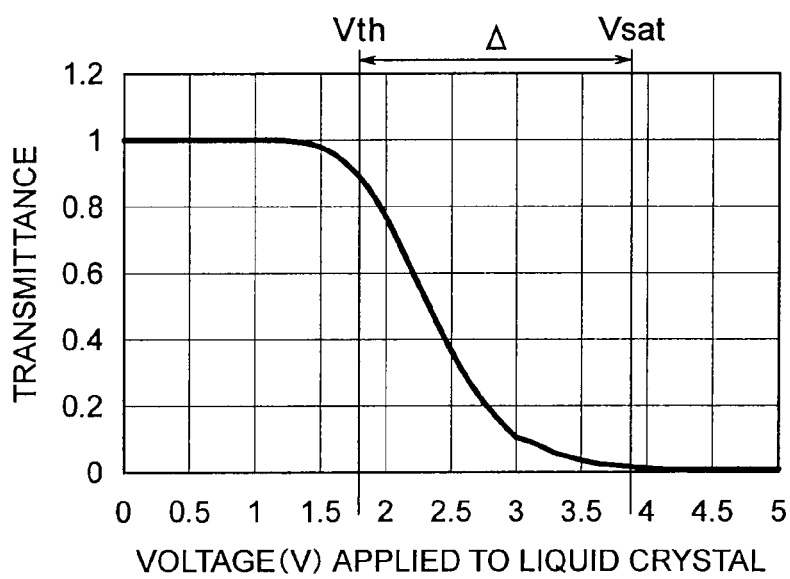
FIG. 2 is a diagram showing a V-T curve of TN liquid crystal used in a variable polarization cell.

FIG. 2 shows a typical V-T curve. Hereafter, a measurement method of the V-T curve will be described. In a polarization microscope, sheet polarizers having a polarization direction which differs from the polarization direction of the variable polarization cell 4 by 90 degrees are placed above and below a variable polarization cell to be investigated. A light source is placed on one of the sheet polarizers, and an analyzer for measuring the luminance is placed on the other of the sheet polarizers. The luminance of the analyzer is converted to a relative value, because its absolute value changes according to the energy of the light source. In a state in which no voltage is applied to the TN liquid crystal, the polarization direction is twisted by 90 degrees because of a twist of the liquid crystal and consequently the luminance of the analyzer side becomes the highest. The luminance in that state is set to unity, and a relative luminance with respect to the maximum luminance is regarded as the transmittance. If a voltage is applied to the variable polarization cell, then the liquid crystal rises and consequently the transmittance approaches 0. FIG. 2 is a graph showing relation between the voltage applied to the variable polarization cell and the relative luminance, i.e., transmittance of the analyzer. A voltage at which the luminance becomes 90% in the V-T curve is regarded as a threshold voltage Vth. The threshold voltage Vth is calculated by using the following expression.

(Equation 1)

$$V_{th} = \pi \sqrt{\frac{1}{\varepsilon_0 \varepsilon_a} \left\{ k_{11} + \frac{1}{4}(k_{33} - 2k_{22}) \right\}} \quad (1)$$

Here, $K_{11}$ is an elastic constant of spray of the liquid crystal, $K_{22}$ is an elastic constant of twist of the liquid crystal, $K_{33}$ is an elastic coefficient of bend of the liquid crystal, $\varepsilon_a$ is a relative dielectric constant of the liquid crystal, and $\varepsilon_0$ is a relative dielectric constant of the vacuum.

Figure 3:
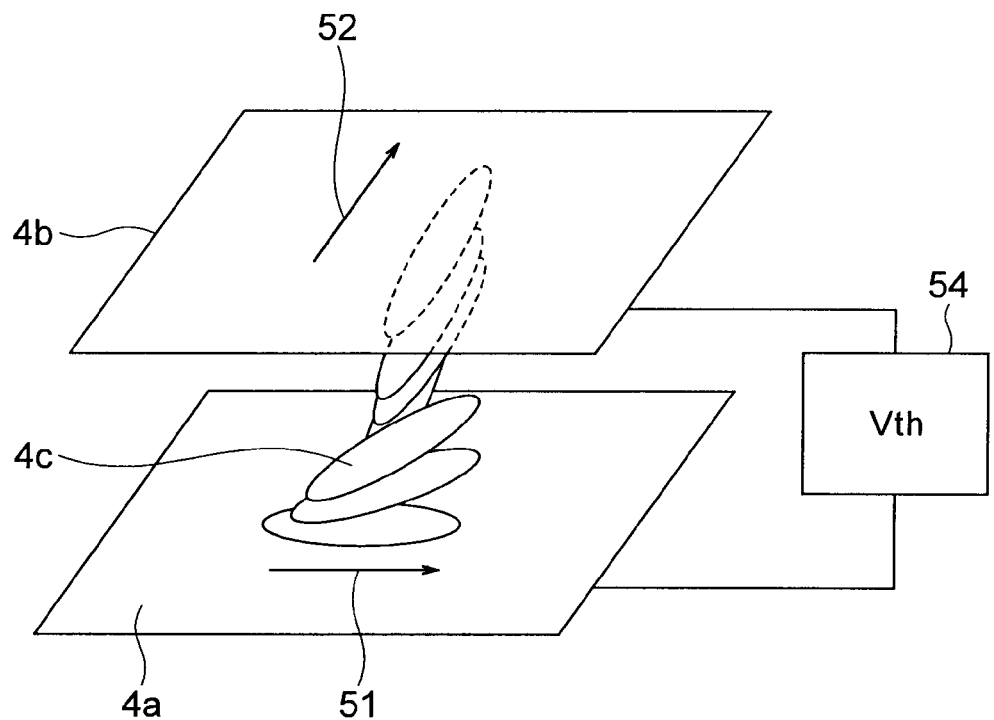
FIG. 3 is a diagram for explaining a state of liquid crystal of a variable polarization cell in a two-dimensional image display mode.
Figure 4:
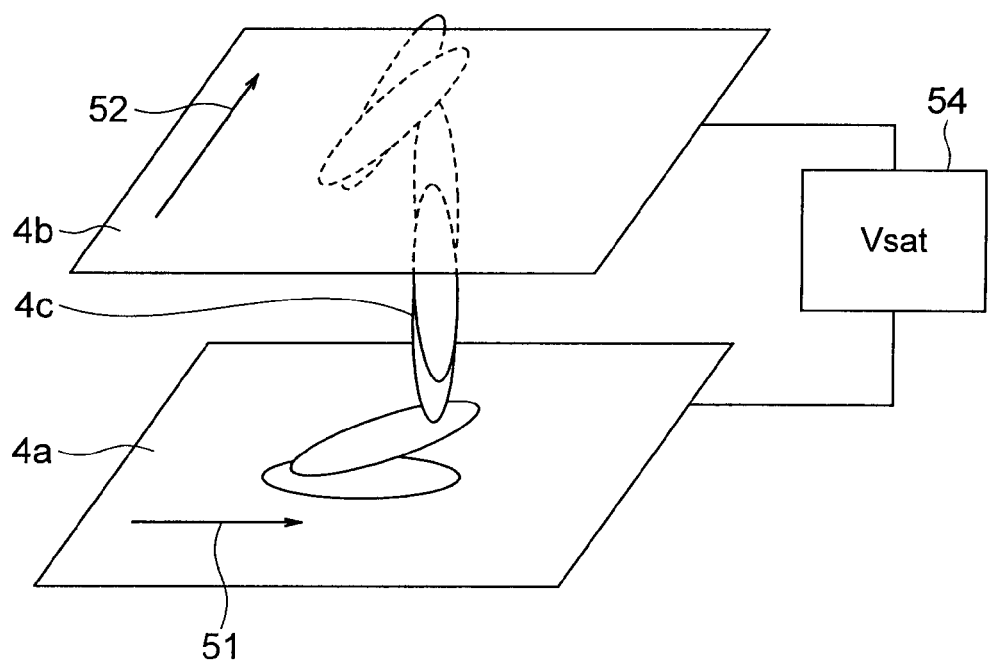
FIG. 4 is a diagram for explaining a state of liquid crystal of a variable polarization cell in a three-dimensional image display mode.

In the two-dimensional image display mode (hereafter referred to as 2D display mode as well), it is necessary that the polarization direction on the electrode substrate 4a disposed under the variable polarization cell 4 and the polarization direction on the electrode substrate 4b disposed over the variable polarization cell 4 differ from each other by 90 degrees, i.e., the liquid crystal 4c is twisted by 90 degrees as shown in FIG. 3. In this case, rubbing directions 51 and 52 are formed respectively on the electrode substrates 4a and 4b so as to differ from each other by 90 degrees and so as to differ by 90 degrees in orientation direction of the liquid crystal as shown in FIG. 3. FIG. 3 is a diagram for explaining a state of liquid crystal of a variable polarization cell in a two-dimensional image display mode. A power supply 54 applies a voltage less than the threshold voltage Vth between the electrode substrates 4a and 4b. The three-dimensional image display mode (hereafter referred to as 3D display mode as well) needs a state in which the liquid crystal 4c has almost risen as shown in FIG. 4. In this case, the power supply 54 applies a voltage which is at least a saturation voltage Vsat described later between the electrode substrates 4a and 4b as shown in FIG. 4. FIG. 4 is a diagram for explaining a state of liquid crystal of a variable polarization cell in a three-dimensional image display mode.

Figure 5:
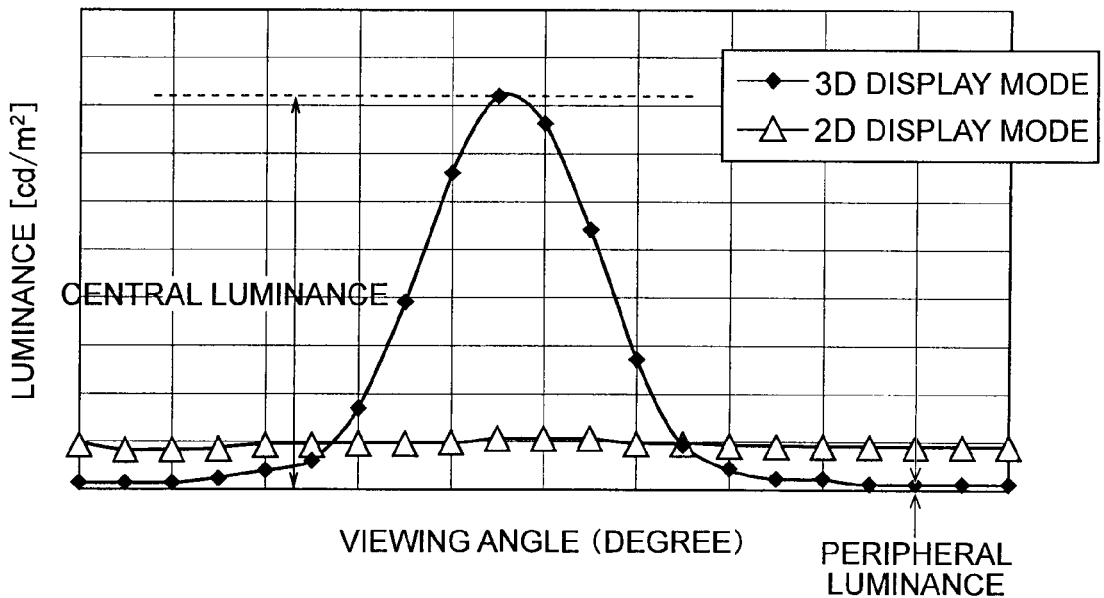
FIG. 5 is a diagram showing dependence of luminance upon an angle obtained when only one elemental image is lit.
Figure 6:
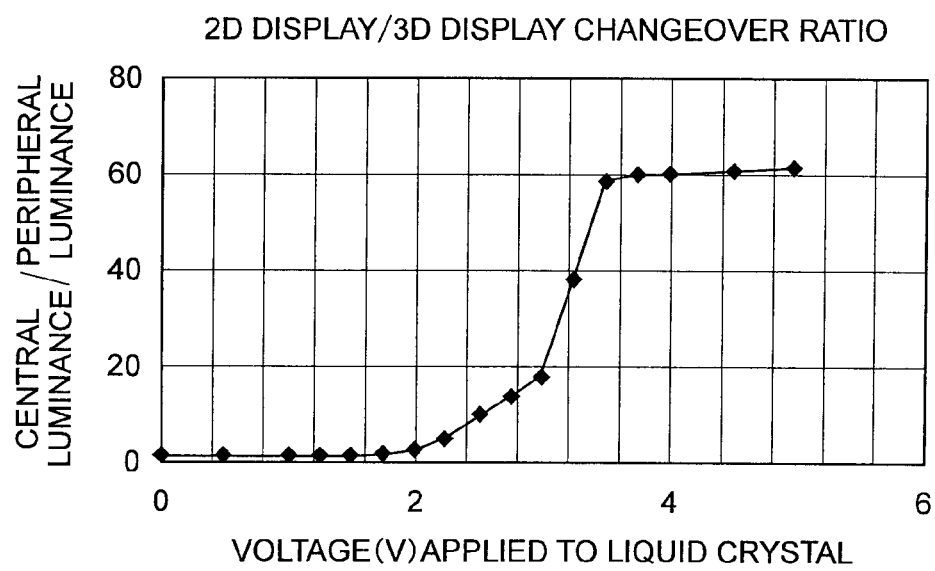
FIG. 6 is a diagram showing dependence of a ratio between a center luminance and a peripheral luminance upon a voltage applied to liquid crystal.

Association relations between the changeover ratios between the two-dimensional image display and the three-dimensional image display and the V-T curve will now be described with reference to FIGS. 5, 6. In the three-dimensional image display mode of an autostereoscopic image display apparatus, it becomes necessary that one elemental image (an image associated with one cylindrical lens) is illuminated to an arbitrary angle with directivity (FIG. 5). On the other hand, in the two-dimensional image display mode, it becomes necessary that information of one pixel is illuminated to all directions without directivity (FIG. 5).

If TN liquid crystal is used, then a transition region voltage width Δ between the threshold voltage Vth and the saturation voltage Vsat becomes wider than that of STN liquid crystal. Therefore, an OFF voltage Voff is at a distance in value from an ON voltage Von. Finding the threshold voltage Vth of the TN liquid crystal 4c shown in FIG. 2 on the basis of Expression (1), both the calculated value and the actually measured value become 1.8 V.

1) In the case of the 2D display mode (the case where $V_{2D}$<Vth), therefore, the threshold voltage Vth becomes 3.8 V on the basis of the calculation and FIG. 2. Here, $V_{2D}$ is a voltage applied to the variable polarization cell 4 when conducting the two-dimensional image display.

2) In the case of the 3D display mode (the case where $V_{3D}$<$V_{sat}$), the saturation voltage $V_{sat}$ becomes 1.8 V on the basis of FIG. 2. Here, $V_{3D}$ is a voltage applied to the variable polarization cell 4 when conducting the three-dimensional image display.

Figure 7:
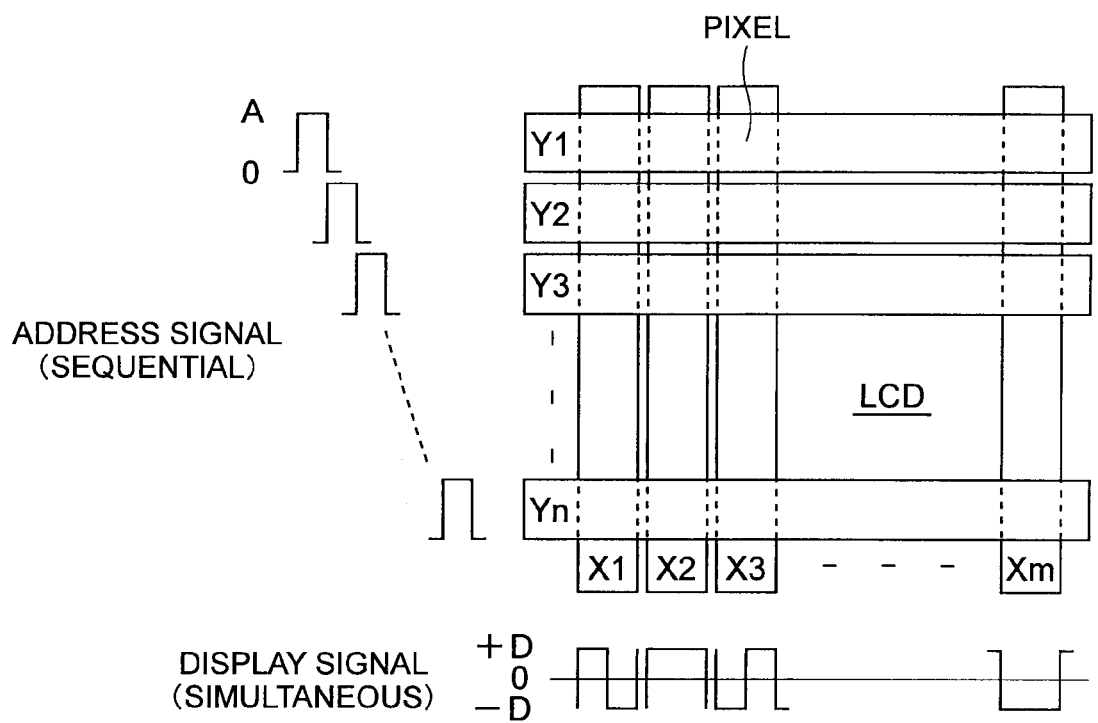
FIG. 7 is a diagram showing an electrode structure in the simple matrix drive scheme.

Typical simple matrix drive in the variable polarization cell will now be described with reference to FIG. 7. Supposing the number of lines in the vertical direction (scanning lines) Y1 to Yn to be n, one frame section is divided by the number n of lines and a pulse of an address waveform for signal waveform selection is generated sequentially for the lines. During a pulse section n of a selected address line, a pulse voltage having a polarity opposite to that of the pulse voltage on the address line is given to a signal line associated with a pixel to be selected to apply a great voltage to the liquid crystal and turn on the display. A pulse voltage having the same polarity as that of the pulse voltage on the address line is given to a signal line associated with a pixel not to be selected to apply a low voltage to the liquid crystal and turn off the display.

Furthermore, since the electro-optic effect of the TN type liquid crystal is the accumulated response type, its transmittance depends on the effective value of the applied voltage. In the simple matrix drive, therefore, a column voltage applied to a column (signal line) X1 to Xm is not made equal to 0 V, but it is made equal to the threshold voltage or below when averaged over one frame, even at the time of OFF, resulting in non-display of the liquid crystal. And an important point of the simple matrix drive technique is that under the condition that the average voltage at the time of OFF is made equal to the threshold voltage or below, a voltage of at least Vsat at which at least 95% of the rise direction of the liquid crystal exists is applied to the liquid crystal as the ON voltage of the polarization selection ratio.

Figure 8:
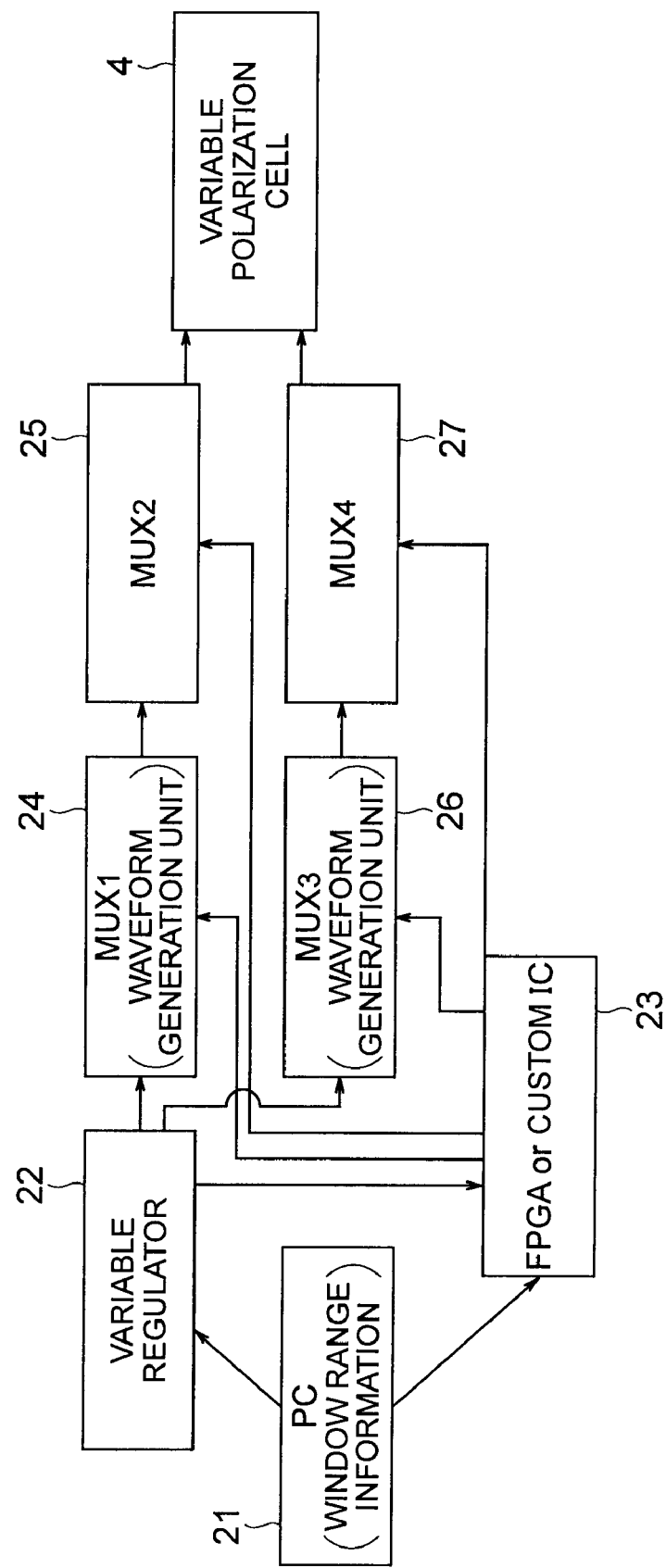
FIG. 8 is a diagram showing an outline of a drive apparatus which implements a drive method according to a first embodiment.

The simple matrix drive using TN liquid crystal in the drive method according to the present embodiment will now be described with reference to FIG. 8. FIG. 8 is a diagram showing a concrete example of a drive circuit which implements the simple matrix drive method. Window range information is acquired from a PC 21 or a window display part for three-dimensional image display (not illustrated). Power is supplied from the PC 21 or an external power supply, and a variable regulator 22 conducts waveform generation and generation of voltages required for Field Programmable Gate Array (FPGA) 23. The FPGA 23 shown in FIG. 8 mainly plays roles of two kinds. One of the roles will now be described. For example, when displaying only one window, MUXs (analog switches) are caused to generate waveforms of two kinds for address signal and waveforms of two kinds for column signal, i.e., generate voltage waveforms of four kinds, LINE_ON, LINE_OFF, COLUMN_ON and COLUMN_OFF according to the frame frequency on the basis of a voltage generated from a variable regulator 22. In other words, the FPGA 23 causes a MUX 24 to generate waveforms of LINE_ON and LINE_OFF at timing according to the frame frequency, causes a MUX 25 to select one voltage waveform from the LINE_ON and LINE_OFF with respect to each line of the variable polarization cell 4, and applies the selected voltage waveform to an associated line. The FPGA 23 causes a MUX 26 to generate waveforms of COLUMN_ON and COLUMN_OFF at timing according to the frame frequency, causes a MUX 27 to select one voltage waveform from the COLUMN_ON and COLUMN_OFF with respect to each column of the variable polarization cell 4, and applies the selected voltage waveform to an associated column. As for the other role, the FPGA 23 classifies ON/OFF lines and columns on the basis of mode range specification from the PC 21, and conducts signal output waveform selection in each line/column by using as many MUX 24, 25, 26 and 27 as the total number of lines and columns.

For example, in the case of display of two windows, the FPGA 23 causes the MUX 24, 25, 26 and 27 to generate waveforms of four kinds for address signal and waveforms of four kinds for column signal on the basis of voltages generated from the variable regulator 22. The case where the window display is OFF is represented as 0 and the case where the window display is ON is represented as 1. ON/OFF states of display of the first window (window 1) and display of the second window (window 2) are represented as (window 1, window 2). The waveform generation units 24, 25, 26 and 27 generate voltage waveforms of eight kinds, LINE_(00), LINE_(01), LINE_(10), LINE_(11), COLUMN_(00), COLUMN_(01), COLUMN_(10) and COLUMN_(11) according to the frame frequency. As for the other role, the FPGA 23 classifies lines and columns which assume the states (00), (01), (10) and (11) on the basis of mode range specification from the PC 21, and conducts signal output waveform selection in each line/column by using as many MUXs as the total number of lines and columns.

Hereafter, features of the drive method in the present embodiment in the case where three-dimensional image display of a rectangular window is conducted in an arbitrary position and with an arbitrary size when a high definition two-dimensional image is displayed on the whole face or the case where high definition two-dimensional image display of a rectangular window is conducted in an arbitrary position and with an arbitrary size when a three-dimensional image is displayed on the whole face will be described. For simplifying the description, the case where at least one window concerning a three-dimensional image is displayed in high definition two-dimensional image displayed over the whole face will now be described. The opposite case is conducted in the same way.

(1) It is now supposed that the number of windows is p ($\geq 1$). First, as a time period for applying a pulse voltage to an address line, one frame section is divided into p places. The same address waveform signal is input at coordinates in the vertical axis direction of the same window.

(2) Paying attention to p windows, flag bits for making a decision whether the coordinates include each window (whether the coordinates overlap each window) as regards the vertical direction and horizontal direction are transmitted.

(3) Average voltage drive in simple matrix drive is conducted. The address voltage and the column signal voltage assume the same values as those implementing a maximum contrast. However, the following two points are points different from the simple matrix drive method.

(a) In a region where window display of a three-dimensional image is not conducted, the pulse on the address line is not made to rise.

(b) On an address line having a coordinate at which a plurality of windows overlap, address pulses also overlap.

The following is supplementary description regarding the above-described three items.

(1) The line sequential drive is not used. A flag bit is made to rise to make a decision whether a certain line includes a window and make a decision whether each window is two-dimensional image display or three-dimensional image display. A voltage at each timing is selected by a changeover unit.

(2) (m+n)×p data are transmitted. Since selection bits (0 or 1) in m×n polarization directions are not transmitted unlike the simple matrix drive, there is a merit that the data transfer quantity is small.

In other words, when displaying a background with one of a three-dimensional image and a two-dimensional image and displaying a first to pth (where p$\geq$1) windows with the other image, the drive method according to the present embodiment includes setting an ith flag bit (where 1$\leq$i$\leq$p) concerning the address lines and indicating whether an ith window overlaps the address lines, and setting an ith flag bit concerning the column lines and indicating whether the ith window overlaps the column lines;

dividing one frame period of the plane display device into p sections as first and second pulses to be applied respectively to the address lines and the column lines, preparing waveforms of $2^p$ kinds which differ in at least one value of the first and second pulses in the section obtained by the division, and associating the waveforms with a set of values of the first to pth flag bits concerning the address lines and the column lines;

selecting one address line and one column line respectively from the n address lines and the m column lines; and applying the first and second pulses associated with the set of values of the first to pth flag bits concerning the selected address line and column line to the selected address line and column line.

Thereby, stereoscopic display is conducted partially in p windows, and plane display is conducted in other areas with a resolution equivalent to the display pixels. Or plane display is conducted partially in p windows with a resolution equivalent to the display pixels, and stereoscopic display is conducted in other areas.

The drive method according to the present embodiment will be described more specifically.

First, the case where there is one window of three-dimensional image display on a background of a high definition two-dimensional image will now be described. If TN liquid crystal is used in the conventional simple matrix drive method, then a transition region voltage width Δ is wide. Therefore, the drive voltage ratio (=Von/Voff) of the variable polarization cell becomes small as the resolution increases. As a result, the three-dimensional image display or the two-dimensional image display is degraded. In order to keep waveform kinds of the address line few even if the resolution of the variable polarization cell becomes high, therefore, places having a window and places having no window are grouped respectively and the same address waveform is input to respective groups. A merit of this drive method is that the waveform kinds are limited by the number of windows regardless of the increase of the resolution of the variable polarization cell. For example, if the number of windows is one, each of the address line and the column line has two kinds. If the number of windows is two, each of the address line and the column line has four kinds. Hereafter, this will be described.

If there is a window of three-dimensional image display on a part of a certain horizontal line or the whole thereof, "1" is made to rise as a flag bit. If there is no window of three-dimensional image display on a certain horizontal line, "0" is made to rise as a flag bit. In order to make a distinction between the case where the flag bit is "1" and the flag bit is "0" in waveform, address waveforms of two kinds are required.

If there is a window of three-dimensional image display on a part of a certain vertical line or the whole thereof, "1" is made to rise as a flag bit. If there is no window of three-dimensional image display on a certain vertical line, "0" is made to rise as a flag bit.

In the same way, in order to make a distinction between the cases where the flag bit is "1" and the flag bit is "0" in waveform, column waveforms of two kinds are required.

Figure 9:
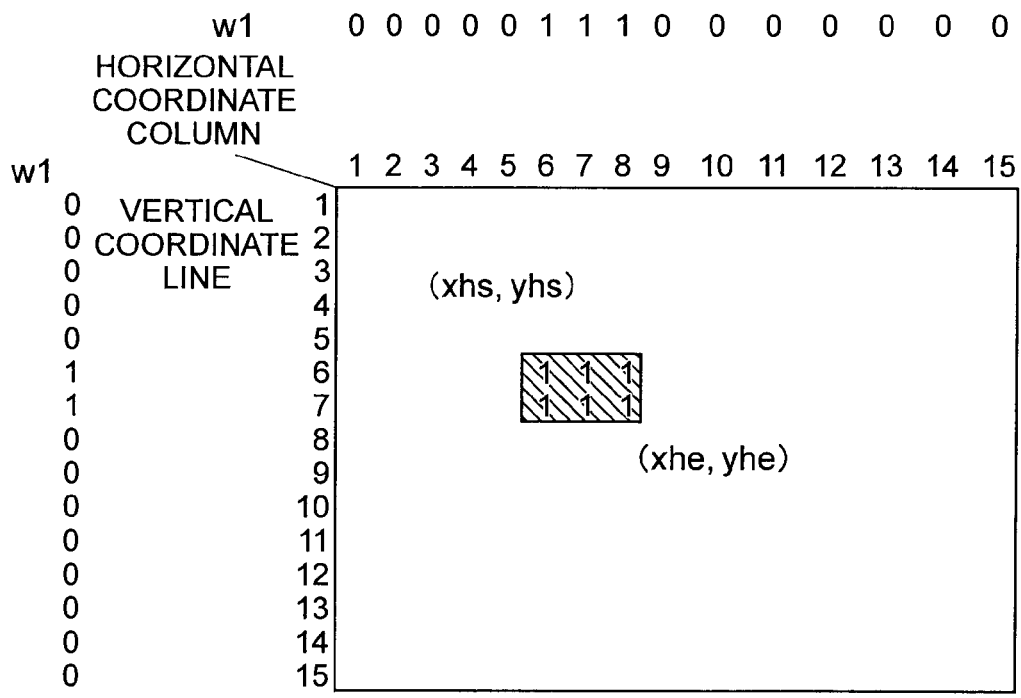
FIG. 9 is a diagram for explaining disposition of a window and flag bits in the first embodiment.

Supposing that the resolution (the number) of address signal lines is n and the resolution (the number) of column signal lines is m, each line transmits only information of one bit (0 or 1) and consequently data transmitted from the PC or a drive device which controls three-dimensional image drawing viewer software becomes (m+n) bits in total as shown in FIG. 9. FIG. 9 is a diagram for explaining disposition of a window and flag bits in the case where there is one window of three-dimensional image display in a background of two-dimensional image display in the first embodiment. Transmission data bits also require less information as compared with (m×n) bits required when bit information of all resolutions is sent.

Figure 10:
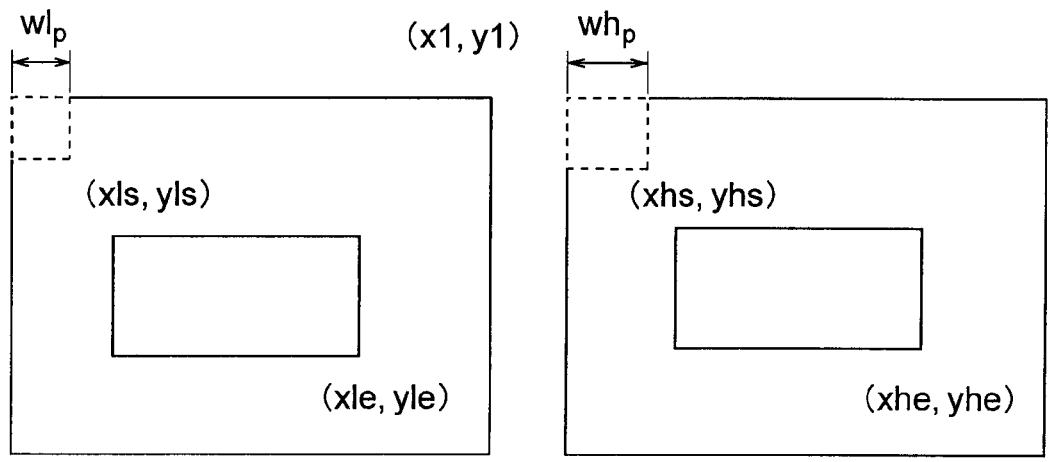
FIG. 10 is a diagram for explaining coordinate conversion between a three-dimensional image viewer and a variable polarization cell in the first embodiment.

As shown in FIG. 9, a window is uniquely determined by left upper coordinates and right lower coordinates of the window. In many cases, the liquid crystal display device serving as the plane display device used when displaying a three-dimensional image has high definition, and the variable polarization cell need not be higher in definition than the lens pitch. In some cases, therefore, their resolutions do not coincide with each other. In order to make the window size and position of the liquid crystal display device serving as the plane display device used when displaying a three-dimensional image coincide with those of the variable polarization cell, therefore, it is necessary to conduct coordinate conversion. This will now be described with reference to FIG. 10. FIG. 10 is a diagram for explaining coordinate conversion between a three-dimensional image viewer and a variable polarization cell in the first embodiment.

First, the case where origins of the liquid crystal display device and the variable polarization cell are made to coincide with each other will now be described. In this case, it is now supposed that left upper coordinates of a window on the liquid crystal display device which displays a three-dimensional image are (xls, yls), right lower coordinates of the window are (xle, yle), the width of one pixel is wlp, left upper coordinates of a window on the variable polarization cell are (xhs, yhs), right lower coordinates of the window are (xhe, yhe), and the width of one pixel is whp. Coordinate conversion can be conducted easily by using the following expressions. If the width whp of one pixel of the variable polarization cell is set equal to a natural number times (k times) the width wlp of one pixel on the liquid crystal display device which displays a three-dimensional image, then coordinates after the conversion become integers and display degradation does not occur, either.

$$xhs = xls/whp \times wlp \qquad (2)$$

$$yhs = yls/whp \times wlp \qquad (3)$$

$$xhe = xle/whp \times wlp \qquad (4)$$

$$yhe = yle/whp \times wlp \qquad (5)$$

$$whp = k \times wlp$$

Here, k represents a natural number.

In this way, the polarization direction of the variable polarization cell is changed so as to be able to display a three-dimensional image without user's burden by linkage with three-dimensional image drawing viewer software.

FIG. 11 is a diagram showing whether to conduct three-dimensional image display for a pixel when address bit information and column bit information are combined with the pixel. If a window of a three-dimensional image is displayed when a two-dimensional image is displayed on the whole face, then the display of the three-dimensional becomes a logical product of address bit information and column bit information.

Drive Waveforms in Case where One Window Displays Three-Dimensional Image

A voltage concerning an address signal is a voltage value applied to one side of an electrode, and a voltage concerning a column signal becomes a voltage value applied to one side of an electrode. A difference between them becomes voltage amplitude applied to liquid crystal.

Furthermore, one frame period is, for example, 60 Hz drive. Each of FIGS. 12($a$) and 12($b$) shows a waveform of half of one frame. FIGS. 12($a$) and 12($b$) are drive waveform diagrams in the case where there is one window which displays a three-dimensional image in a background of two-dimensional image display in the first embodiment. In the latter half of one frame, the voltage value is inverted. When a voltage is applied in one direction, therefore, sticking which occurs as the degradation of liquid crystal can be prevented.

In the address signal shown in FIG. 12($a$), a flag of w1 is set to "1" when there is a 3D window on a horizontal line and the flag is set to "0" when there is no 3D window. In the column signal shown in FIG. 12($b$) as well, a flag of w1 is set to "1" when there is a 3D window on a vertical line and the flag is set to "0" when there is no 3D window.

In the case of "0" in the address waveform, a voltage value is set to $$Va1\text{"0"} = 0 \qquad (6)$$

As for the column waveform, the 3D display is OFF in both cases where (address flag, column flag) is (0, 0) and (0, 1) as shown in FIG. 11. As a result, voltage amplitude of Vth or less is given. Therefore, the column waveform is made to satisfy the following relations.

$$\text{Absolute value}(Va1\text{"0"} - Vc1\text{"0"}) \leq V\text{th}$$

$$\text{Absolute value}(Va1\text{"0"} - Vc1\text{"1"}) \leq V\text{th}$$

Here, under the condition that the above two expressions are satisfied, maximum limit values of Vc1"0" and Vc1"1" can be found as:

$$Vc1\text{"0"} = V\text{th} \qquad (7)$$

$$Vc1\text{"1"} = -V\text{th} \qquad (8)$$

For making the 3D display OFF when (address flag, column flag) is (1, 0), the following relation should be satisfied.

$$Va1\text{"1"} - Vc1\text{"0"} = Va1\text{"1"} - Vd \leq V\text{th}$$

Here, the following relation can be satisfied.

$$Va1\text{"1"} = V\text{th} + V\text{th} = 2 \times V\text{th} \qquad (9)$$

For making the 3D display ON when (address flag, column flag) is (1, 1), the following relation should be satisfied.

$$Va1\text{"1"} - Vc1\text{"1"} \geq V\text{sat} \qquad (10)$$

Substituting (8) and (9) into (10), we get $$Va1\text{"1"} - Vc1\text{"1"} = 3 \times V\text{th} \geq V\text{sat} \qquad (11)$$

If Vsat is 3.8 V and Vth is 1.8 V as shown in FIG. 2, then Expression (11) is satisfied and consequently drive at the voltage value is possible.

In the foregoing description, the upper limit value of Vd is Vd=Vth. At that time, it follows that Vsat=5.55 V and it is sufficient for three-dimensional image display of the polarization selection ratio.

For example, when turning on a shaded area shown in FIG. 9, lines having Y coordinates yhs to yhe to be turned on are provided with 1.8 (Vth)×2=3.6 V, other lines are provided with 0 V, columns having X coordinates xhs to xhe to be turned on are provided with −1.8 (Vth) V, and other columns (0 to xhs−1, xhe+1 to 15) are provided with +1.8 V. Line selection of this one time corresponds to one frame, and the phase is reversed in the next frame. The operations are repeated alternately. This is conducted to prevent sticking of the liquid crystal 4c in the variable polarization cell 4. In the range to be turned on, the voltage difference is maximized in the line direction and the column direction. In the range to be turned off, the voltage difference is minimized.

Drive Waveforms in Case where One Window Displays Two-Dimensional Image

The drive waveforms in the case where there is one window which displays a two-dimensional image on a background of a three-dimensional image will now be described. When address bit information and column bit information are combined with a certain pixel, the three-dimensional image display becomes a logical sum of address bit information and column bit information as shown in FIG. 13. FIG. 13 is a diagram showing relations among address bit information, column bit information and three-dimensional image display in the first embodiment.

Figure 14:
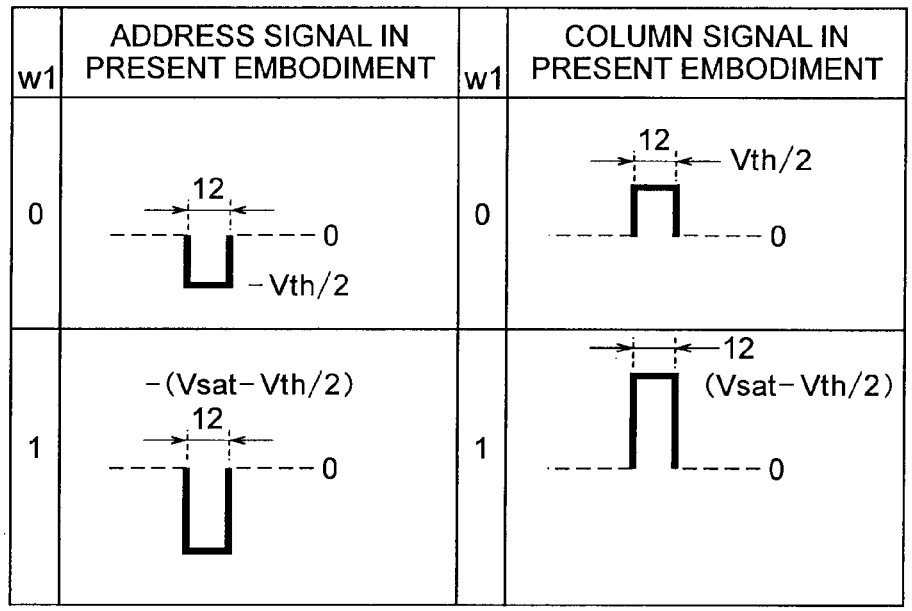
FIG. 14 is a drive waveform diagram in the case where there is one window which displays a two-dimensional image in a background of three-dimensional image display.

In the address signal shown in FIG. 14, a flag of w1 is set to "1" when there is a 3D window on a horizontal line and the flag is set to "0" when there is no 3D window. In the column signal as well, a flag of w1 is set to "1" when there is a 3D window on a vertical line and the flag is set to "0" when there is no 3D window. FIG. 14 is a drive waveform diagram in the case where there is one window which displays a two-dimensional image in a background of three-dimensional image display.

In the case of "0" in the address waveform, a voltage value is set to $$Va1\text{"}0\text{"}=-V\text{th}/2 \qquad (12)$$

As for the column waveform, the 3D display is OFF in the case where (address flag, column flag) is (0, 0) as shown in FIG. 13. As a result, voltage amplitude of Vth or less in difference absolute value is given. Therefore, the column waveform is made to satisfy the following relation.

$$\text{Absolute value}(Va1\text{"}0\text{"}-Vc1\text{"}0\text{"}) \leq V\text{th}$$

Here, as an example, the following relation may be set.

$$Vc1\text{"}0\text{"}=V\text{th}/2 \qquad (13)$$

Since the 3D display is ON in the case where (address flag, column flag) is (0, 1) as shown in FIG. 13, $$\text{Absolute value}(Va1\text{"}0\text{"}-Vc1\text{"}1\text{"}) \leq V\text{sat} \qquad (14)$$

Substituting (12) into (14), the lowest limit value of Vc1"1" is found as follows:

$$-V\text{th}/2-Vc1\text{"}1\text{"}=V\text{sat}$$

Therefore, as an example, $$Vc1\text{"}1\text{"}=V\text{sat}-V\text{th}/2 \qquad (15)$$

is conceivable. Since the 3D display is OFF in the case where (address flag, column flag) is (1, 0), $$\text{Absolute value}(Va1\text{"}1\text{"}-Vc1\text{"}0\text{"}) \geq V\text{sat} \qquad (16)$$

Substituting (15) into (16), and finding the lowest limit value of an absolute value of Va1"1" for satisfying the relation $$\text{Absolute value}(Va1\text{"}1\text{"}-V\text{th}/2) \geq V\text{sat},$$

the relation $$-(Va1\text{"}1\text{"}-V\text{th}/2)=-V\text{sat}$$

should be satisfied.

$$Va1\text{"}1\text{"}=-V\text{sat}+V\text{th}/2 \qquad (17)$$

is conceivable as an example. Finally, since the 3D display is ON in the case where (address flag, column flag) is (1, 1), $$\text{Absolute value}(Va1\text{"}1\text{"}-Vc1\text{"}1\text{"}) \geq V\text{sat} \qquad (18)$$

is satisfied. Substituting (15) and (17) into (18), we get $$V\text{sat}-V\text{th}/2-(-V\text{sat}+V\text{th}/2)=2\times V\text{sat}-V\text{th} \geq V\text{sat}$$

Supposing that Vsat is 3.8 V and Vth is 1.8 V, Expression 18 is satisfied, and consequently drive with the above-described voltage value is possible.

In this case as well, in order to prevent the sticking of the liquid crystal 4c of the variable polarization cell 4, the address signal pulse voltage Va repetitively assumes −Vth/2 and Vth/2 alternately and the column signal pulse voltage Vd repetitively assumes Vth/2 and −Vth/2 alternately, when displaying a two-dimensional image in a window. In areas other than the window for displaying a three-dimensional image, the address signal pulse voltage Va repetitively assumes −(Vsat−Vth/2) and (Vsat−Vth/2) alternately and the column signal pulse voltage Vd repetitively assumes (Vsat−Vth/2) and −(Vsat−Vth/2) alternately.

Figure 15:
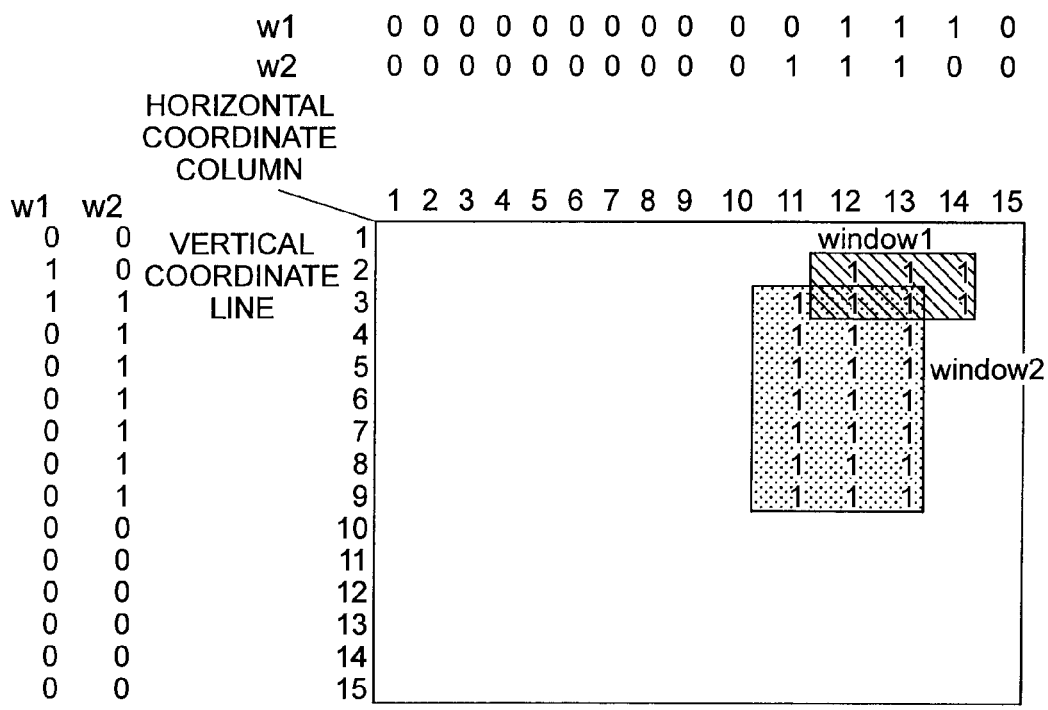
FIG. 15 is a diagram for explaining disposition of windows and flag bits in the first embodiment.

Drive Waveforms in Case where there are Two Three-Dimensional Image Display Windows Drive waveforms in the case where there are two three-dimensional image display windows on a background of a high definition two-dimensional image as shown in FIG. 15 will now be described. FIG. 15 is a diagram for explaining disposition of windows and flag bits in the case where there are two windows which display a three-dimensional image in a background of two-dimensional image display in the first embodiment.

Figure 17:
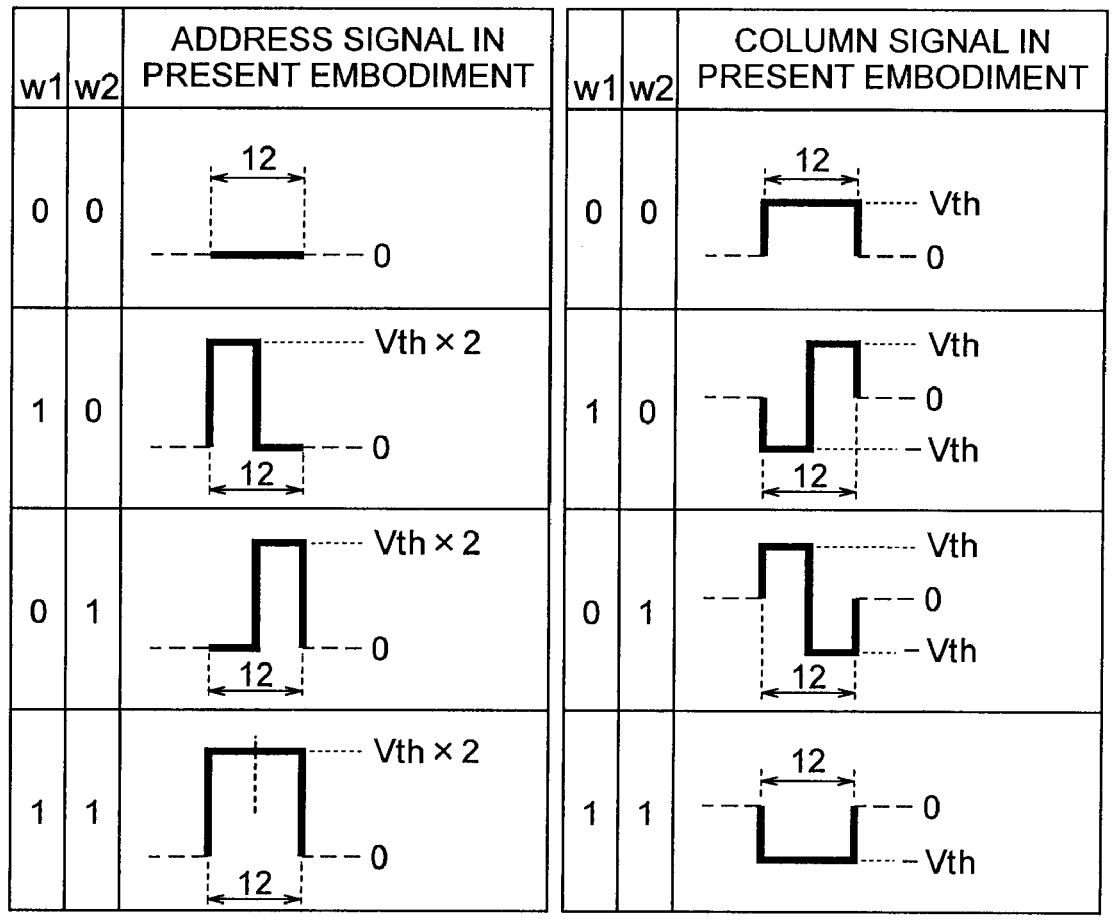
FIG. 17 is a drive waveform diagram in the first embodiment.

If there is a window of three-dimensional image display referred to as window 1 on a part or the whole of a certain horizontal line (scanning line), then "1" is set as a flag bit. If there is no window of three-dimensional image display on a certain horizontal line, then "0" is set as the flag bit. If there is a window of three-dimensional image display referred to as window 2, then "1" is set as the flag bit. If there is no window of three-dimensional image display on a certain horizontal line, then "0" is set as the flag bit. As regards each of window 1 and window 2, the waveform is distinguished according to whether the flag bit is "1" or "0" as shown in FIG. 16. FIG. 16 is a diagram showing relations between drive waveforms applied to lines and columns and a display mode in the case where there are two windows which display a three-dimensional image in a background of two-dimensional image display in the first embodiment. There are address waveforms of four kinds. In the same way, in the column waveform as well, as regards each of the window 1 and the window 2, the waveform is distinguished according to whether the flag bit is "1" or "0" as shown in FIG. 17. FIG. 17 is a drive waveform diagram in the case where there are two windows which display a three-dimensional image in a background of two-dimensional image display in the first embodiment. There are column waveforms of four kinds. FIG. 17 shows a concrete example of the address waveform and the column waveform.

Letting Vth=1.8 V and Vsat=3.8 V and denoting the flag bit of the window 1 by w1 and the flag bit of the window 2 by w2, an address signal pulse voltage Va shown in FIG. 17 is applied according to whether (w1, w2) is (0, 0), (0, 1), (1, 0) or (1, 1).

FIG. 17 shows a waveform of half of a frame. In a latter half of one frame, the voltage value is inverted. If a voltage is applied in one direction, therefore, sticking caused by degradation of the liquid crystal can be prevented. In FIG. 17, half a frame is bisected, and the former half is provided with a voltage value according to flag information of the window 1 and the latter half is provided with a voltage value according to flag information of the window 2.

If one window displays a three-dimensional image, the voltage value may be the same as the voltage value of drive waveform. In other words, if the window 1 is included in a horizontal line, the former half of a half frame assumes $$Va\text{"}1\text{"} = V\text{th} \times 2 \tag{19}$$

If the window 2 is included in a horizontal line, the latter half of the half frame assumes $$Va\text{"}1\text{"} = V\text{th} \times 2$$

In the same way, if the window 1 is not included in a horizontal line, the former half of the half frame assumes $$Va\text{"}0\text{"} = 0 \tag{20}$$

If the window 2 is not included in a horizontal line, the latter half of the half frame assumes $$Va\text{"}0\text{"} = 0$$

The same holds true as regards the column line as well.
If the window 1 is included in a vertical line, the former half of a half frame assumes $$Vd\text{"}1\text{"} = V\text{th} \tag{21}$$

If the window 2 is included in a vertical line, the latter half of the half frame assumes $$Vd\text{"}1\text{"} = V\text{th}$$

In the same way, if the window 1 is not included in a vertical line, the former half of the half frame assumes $$Va\text{"}0\text{"} = -V\text{th} \tag{22}$$

If the window 2 is not included in a vertical line, the latter half of the half frame assumes $$Va\text{"}0\text{"} = -V\text{th}$$

The right side of FIG. 16 shows ON/OFF of the 3D display mode of the window 1 and the window 2 when the above-described voltage value is applied.

In the present example, a pulse voltage shown in FIG. 17 is applied in a certain frame and a voltage obtained by inverting the pulse voltage shown in FIG. 17 (a voltage inverted in sign) is applied in the next frame, in order to prevent sticking of the liquid crystal 4c of the variable polarization cell 4.

The maximum value of the address signal voltage Va is twice the maximum value of the data signal voltage Vd. If the maximum value of the data signal voltage is kept at the threshold voltage Vth or less, the maximum value of the difference (=data signal voltage) between the address signal and the data signal also becomes the threshold voltage Vth or less.

Since TN liquid crystal is the accumulated response type, voltage divided in one frame and applied can be calculated as follows:

$$Von^2 = \frac{1}{T}\left\{(\text{former half of } V)^2 \frac{T}{2} + (\text{latter half of } V)^2 \frac{T}{2}\right\} \tag{23}$$

If the address signal becomes (0, 0) and the column signal becomes (0, 0), then the voltage applied to the liquid crystal is Vth over the half frame. In the same way as the window 1, therefore, the 3D display mode becomes OFF.

A voltage applied to a pixel in a three-dimensional image display frame of the window 2 with the address signal (0, 1) and the column signal (0, 1) is calculated. Expression (24) is obtained.

$$Von^2 = \frac{1}{T}\left\{(V_a + V_d)^2 \frac{T}{2} + V_d^2 \frac{T}{2}\right\} \tag{24}$$

Here, T represents one frame period.
Letting Va=3.6 V and Vd=1.8 V, Von becomes 4.02 V and it exceeds the threshold voltage Vth.

A voltage applied to a pixel located outside a three-dimensional image display frame of the window 2 with the address signal (0, 1) and the column signal (1, 0) is calculated. Expression (25) is obtained.

$$Voff^2 = \frac{1}{T}\left\{(V_a + V_d)^2 \frac{T}{2} + V_d^2 \frac{T}{2}\right\} \tag{25}$$

Letting Va=3.6 V and Vd=1.8 V, Voff becomes 1.8 V and it becomes the threshold voltage Vth or less.

FIG. 17 shows voltage applied to the liquid crystal during one frame. Drive voltages which satisfy specifications are obtained. If the address signal is (1, 1) and the column signal is (1, 1), the following expression is satisfied: 3×Vth>Vsat over the half frame. Therefore, the three-dimensional image display turns on. Since Va is twice Vd, it follows that Va−Vd=Vd. No matter whether the voltage in the address waveform is 0 or Va, if Vd is the same in polarity as Va, i.e., the column waveform is OFF, then the voltage applied to the liquid crystal becomes the threshold voltage Vth or less, resulting in non-selection. On a line having both the window 1 and the window 2, therefore, the voltage becomes Va in both the former half and the latter half of the frame. In the case of non-selection in the column waveform (bit 0 in the two-dimensional image display mode), however, the voltage applied to the liquid crystal becomes the threshold voltage Vth or less. If the liquid crystal has poor threshold characteristics, however, the polarization selection ratio is degraded at Von=4.02 V. In some cases, therefore, the three-dimensional image display is degraded. In the kind of TN liquid crystal as well, it is necessary to select TN liquid crystal having a good V-T curve.

Drive Waveform in Case where there are Two Two-Dimensional Image Display Windows A drive waveform in the case where there are two high definition two-dimensional image display windows on a background of a three-dimensional image display will now be described.

If there is a two-dimensional image display window referred to as window 1 on a part or the whole of a certain horizontal line, then "0" is set as a flag bit. If there is no two-dimensional image display window on a certain horizontal line, then "1" is set as the flag bit. If there is a two-dimensional image display window referred to as window 2, then "0" is set as the flag bit. If there is no three-dimensional image display window on a certain horizontal line, then "1" is set as the flag bit. As regards each of the window 1 and window 2, the waveform is distinguished according to whether the flag bit is "1" or "0" as shown in FIG. 18. There are address waveforms of four kinds. FIG. 18 is a diagram showing relations between drive waveforms applied to lines and columns and a display mode in the case where there are two windows which display a two-dimensional image in a background of three-dimensional image display in the first embodiment.

Figure 19:
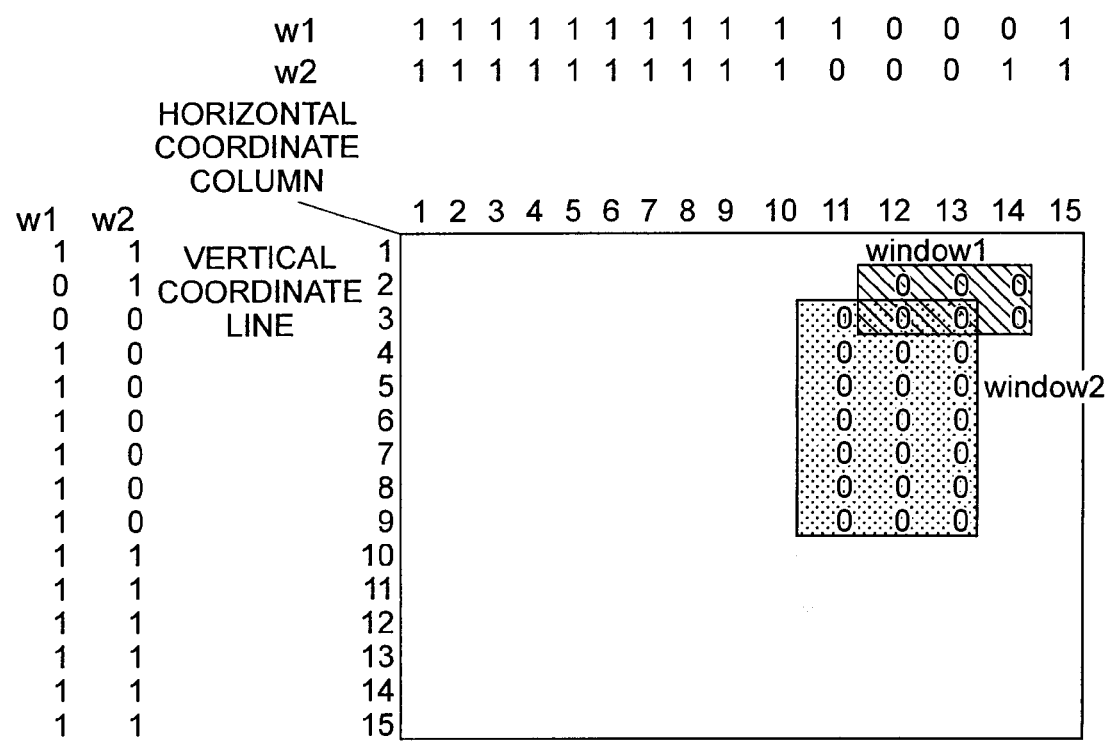
FIG. 19 is a diagram for explaining disposition of windows and flag bits in the first embodiment.
Figure 20:
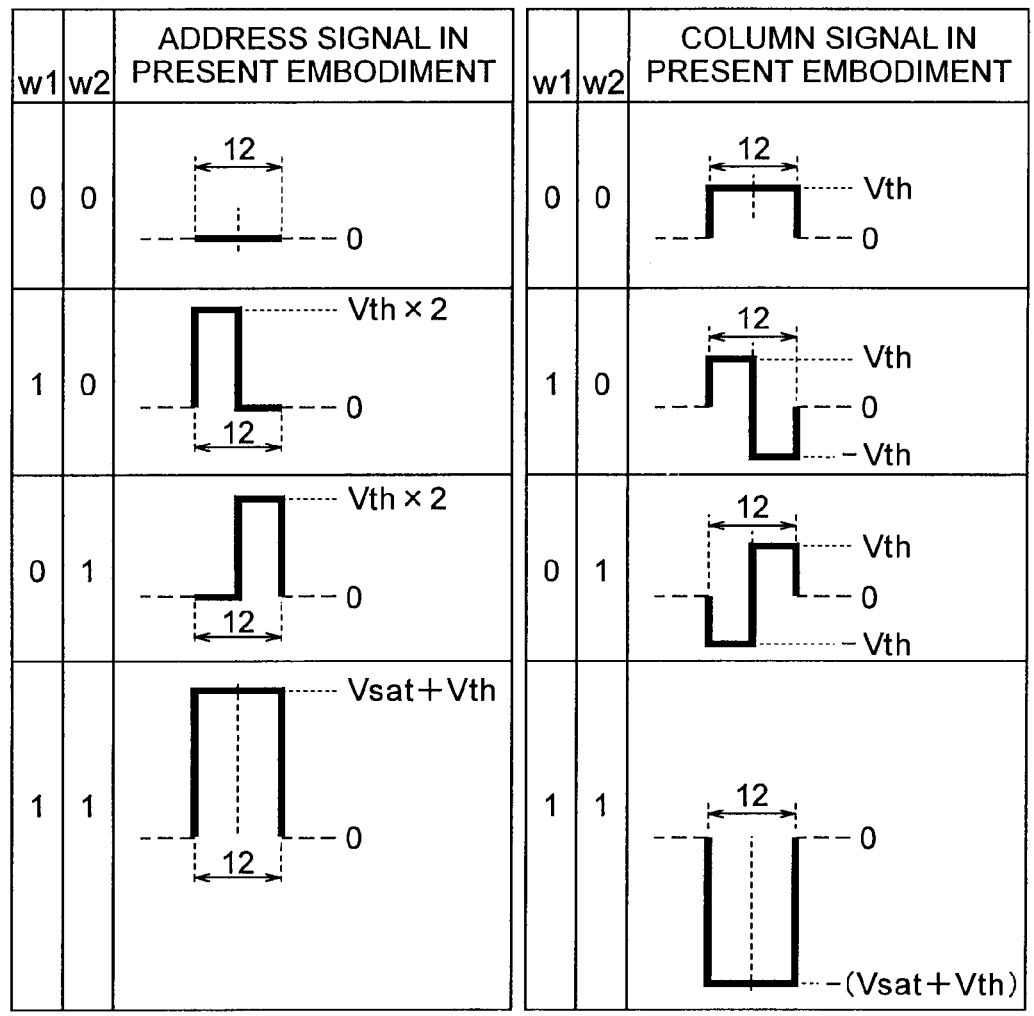
FIG. 20 is a drive waveform diagram in the case where there are two windows which display a three-dimensional image in a background of two-dimensional image display.

In the same way, in the column waveform as well, as regards each of the window 1 and window 2, the waveform is distinguished according to whether the flag bit is "1" or "0" as shown in FIG. 19. FIG. 19 is a diagram for explaining disposition of windows and flag bits in the case where there are two windows which display a two-dimensional image in a background of three-dimensional image display in the first embodiment. There are column waveforms of four kinds. FIG. 20 shows a concrete example of the address waveform and the column waveform.

Letting Vth=1.8 V and Vsat=3.8 V, an address signal pulse voltage shown in FIG. 20 is applied according to whether (w1, w2) is (0, 0), (0, 1), (1, 0) or (1, 1).

FIG. 20 is a drive waveform diagram in the case where there are two windows which display a three-dimensional image in a background of two-dimensional image display in the first embodiment. FIG. 20 shows a waveform of half of a frame. In a latter half of one frame, the voltage value is inverted. If a voltage is applied in one direction, therefore, sticking caused by degradation of the liquid crystal can be prevented. In FIG. 20, the half frame is bisected, and the former half is provided with a voltage value according to flag information of the window 1 and the latter half is provided with a voltage value according to flag information of the window 2.

If one window displays a two-dimensional image when the whole screen is in the three-dimensional image display state, then the voltage value is different from that of the drive waveform. In other words, if the window 1 is included in a horizontal line, 2D display is conducted when the former half of the half frame is (w1 address flag, w2 address flag, w1 column flag, w2 column flag)=(0, 0, 0, 0), (0, 1, 0, 0), (1, 0, 0, 0), (0, 0, 1, 0), (0, 0, 0, 1), (0, 1, 0, 1), (1, 0, 1, 0). In other words, 2D display is conducted in a position where the column and address of w1 simultaneously become 0 or in a position where the column and address of w2 simultaneously become 0.

The voltage value shown in FIG. 14 in the case where there is one 2D window differs from that shown in FIG. 20 in the case where there are two 2D windows. Because 3D display is conducted when (w1 address flag, w2 address flag, w1 column flag, w2 column flag)=(0, 1, 0, 1) and (1, 0, 1, 0).

In the case of two 2D windows, therefore, the following method can be taken. In FIG. 20, different voltage value is assumed according to whether w2 is 0 or 1 when w1 is 0. In other words, the averaged voltage becomes the threshold voltage or less which brings about the 2D display or at least the saturation voltage which brings about 3D display according to a combination of w1 and w2. As an example, FIG. 20 can be mentioned.

If as regards the flags Va(W1, W2)=(1, 0) and Vd(W1, W2)=(1, 0), then it is meant that the window 1 becomes the 2D display. As shown in FIG. 20, the voltage applied to the address line becomes in the former half of the half frame $Va(0 \text{ to } 1/4 \text{ frame})(1,0)=V\text{th}\times 2$ $Va(1/4 \text{ to } 1/2 \text{ frame})(1,0)=0$ After the ½ frame, an inverted voltage is applied in order to prevent the sticking of the liquid crystal.

$Va(1/2 \text{ to } 3/4 \text{ frame})(1,0)=-V\text{th}\times 2$ $Va(3/4 \text{ to } 1 \text{ frame})(1,0)=0$ As shown in FIG. 20, the voltage applied to the column line becomes in the former half of the half frame $Vd(0 \text{ to } 1/4 \text{ frame})(1,0)=V\text{th}$ $Vd(1/4 \text{ to } 1/2 \text{ frame})(1,0)=-V\text{th}$ After the ½ frame, an inverted voltage is applied in order to prevent the sticking of the liquid crystal.

$Vd(1/2 \text{ to } 3/4 \text{ frame})(1,0)=V\text{th}$ $Vd(3/4 \text{ to } 1 \text{ frame})(1,0)=-V\text{th}$ From the foregoing description, the same voltage value Vth is applied to the liquid crystal over 0 to ¼ frame and ¼ to ½ frame. As a result, the 2D display can be maintained.

If as regards the flags Va(W1, W2)=(1, 0) and Vd(W1, W2)=(0, 1), then it is meant that the window 1 becomes the 2D display. As shown in FIG. 20, the voltage applied to the address line becomes in the former half of the half frame $Va(0 \text{ to } 1/4 \text{ frame})(1,0)=V\text{th}\times 2$ $Va(1/4 \text{ to } 1/2 \text{ frame})(1,0)=0$ After the ½ frame, an inverted voltage is applied in order to prevent the sticking of the liquid crystal.

$Va(1/2 \text{ to } 3/4 \text{ frame})(1,0)=-V\text{th}\times 2$ $Va(3/4 \text{ to } 1 \text{ frame})(1,0)=0$ As shown in FIG. 20, the voltage applied to the column line becomes in the former half of the half frame $Vd(0 \text{ to } 1/4 \text{ frame})(1,0)=-V\text{th}$ $Vd(1/4 \text{ to } 1/2 \text{ frame})(1,0)=V\text{th}$ After the ½ frame, an inverted voltage is applied in order to prevent the sticking of the liquid crystal.

$Vd(1/2 \text{ to } 3/4 \text{ frame})(1,0)=-V\text{th}$ $Vd(3/4 \text{ to } 1 \text{ frame})(1,0)=V\text{th}$ From the foregoing description, Vth×3 is applied to the liquid crystal over 0 to ¼ frame and Vth is applied to the liquid crystal over 0 to ¼ frame. Substituting these values into Expression 23, it follows that $V\text{average}=\sqrt{5}\times V\text{th}$ Letting Vth=1.8 V and Vsat=3.8V, it follows that $V\text{average}=4.02 \ V>V\text{sat}$ As a result, 3D display becomes possible.

The combination of w1 and w2 flags and the voltage applied to the liquid crystal have been shown in FIG. 20. When the window w1 or w2 is OFF, 3D display is also OFF and desired display can be conducted.

In the present example, a pulse voltage shown in FIG. 20 is applied in a certain frame and a voltage obtained by inverting the pulse voltage shown in FIG. 20 (a voltage inverted in sign) is applied in the next frame, in order to prevent sticking of the liquid crystal 4c of the variable polarization cell 4.

Second Embodiment

A drive method for stereoscopic image display apparatus according to a second embodiment of the present invention will now be described. The drive method according to the present embodiment is used in the stereoscopic image display apparatus shown in FIG. 1 in the same way as the drive method according to the first embodiment. However, the drive method according to the present embodiment differs in the drive method of the variable polarization cell 4 from the drive method according to the first embodiment. The drive method according to the present embodiment is a drive method which maximizes the contrast.

Drive of the variable polarization cell 4 according to the drive method in the present embodiment will now be described. In the case of one window, the waveform differs utterly according to whether there is a window of three-dimensional image display in a high definition two-dimensional image or there is a window of two-dimensional image display in a background of a three-dimensional image. Therefore, it is necessary to prepare five kinds of voltage value inclusive of 0 V. Even in an address waveform having no window of three-dimensional image display, however, simpler voltage drive can be conducted by applying an address voltage.

Drive Waveforms in Case where there are p (p≧1) Three-Dimensional Image Display Windows First, drive waveforms in the case where there are p three-dimensional image display windows in a high definition two-dimensional image will now be described.

If there is a three-dimensional image display window on a part or the whole of a certain horizontal line, then "1" is set as a flag bit. If there is no three-dimensional image display window on a certain horizontal line, then "0" is set as the flag bit. For making a distinction in waveform between the flag bit "1" and the flag bit "0", address waveforms of two kinds suffice.

If there is a three-dimensional image display window on a part or the whole of a certain vertical line, then "1" is set as a flag bit. If there is no three-dimensional image display window on a certain vertical line, then "0" is set as the flag bit. For making a distinction in waveform between the flag bit "1" and the flag bit "0", column waveforms of two kinds suffice in the same way.

It is now supposed that a voltage is applied to TN liquid crystal which forms the variable polarization cell 4, the director of the liquid crystal begins to rise at a voltage Vth, and the liquid crystal rises 95% at a voltage Vsat. In the drive method according to the present embodiment, the polarization direction is changed as regards p window areas whereas the polarization direction is not changed as regards areas other than p window areas. On one substrate of two opposed transparent substrates of the variable polarization cell 4, n transparent electrodes are disposed in a first direction (for example, in the horizontal direction). Address line numbers 1 to n are assigned to the n transparent electrodes. On the other transparent substrate, m transparent electrodes are disposed in a direction (for example, in the vertical direction) nearly perpendicular to the first direction. Column line numbers 1 to m are assigned to the m transparent electrodes. At this time, in the drive waveforms (address waveforms) for a line in the horizontal direction, one frame period is divided equally into (p+1) widths. Waveforms corresponding to (p+1) widths each having a maximum voltage Va are not applied successively in the ascending line number. The same pulse waveform having the voltage value Va in kth width in one frame is applied to a plurality of lines which overlap kth (where 1≦k≦p) window. The same pulse waveform having the maximum voltage value Va in the (p+1)th width is applied to lines which do not overlap any window.

On the other hand, as for the column signal lines in the vertical direction, one frame is divided into (p+1) equal parts. On a column signal line which overlaps kth window, the same pulse signal having a voltage value −Vd in the kth part in one frame is applied. The same pulse signal having a voltage value Vd is applied to a column signal line which overlaps a window different from the kth window. In addition, the voltage Vd is always applied to a column signal which does not overlap any window. By the way, the reason why one frame is divided into (p+1) parts and the above-described drive waveforms are applied is that liquid crystal which forms the variable polarization cell 4 is TN liquid crystal and its drive voltage is set by an average value of voltage applied during one frame period.

Figure 21:
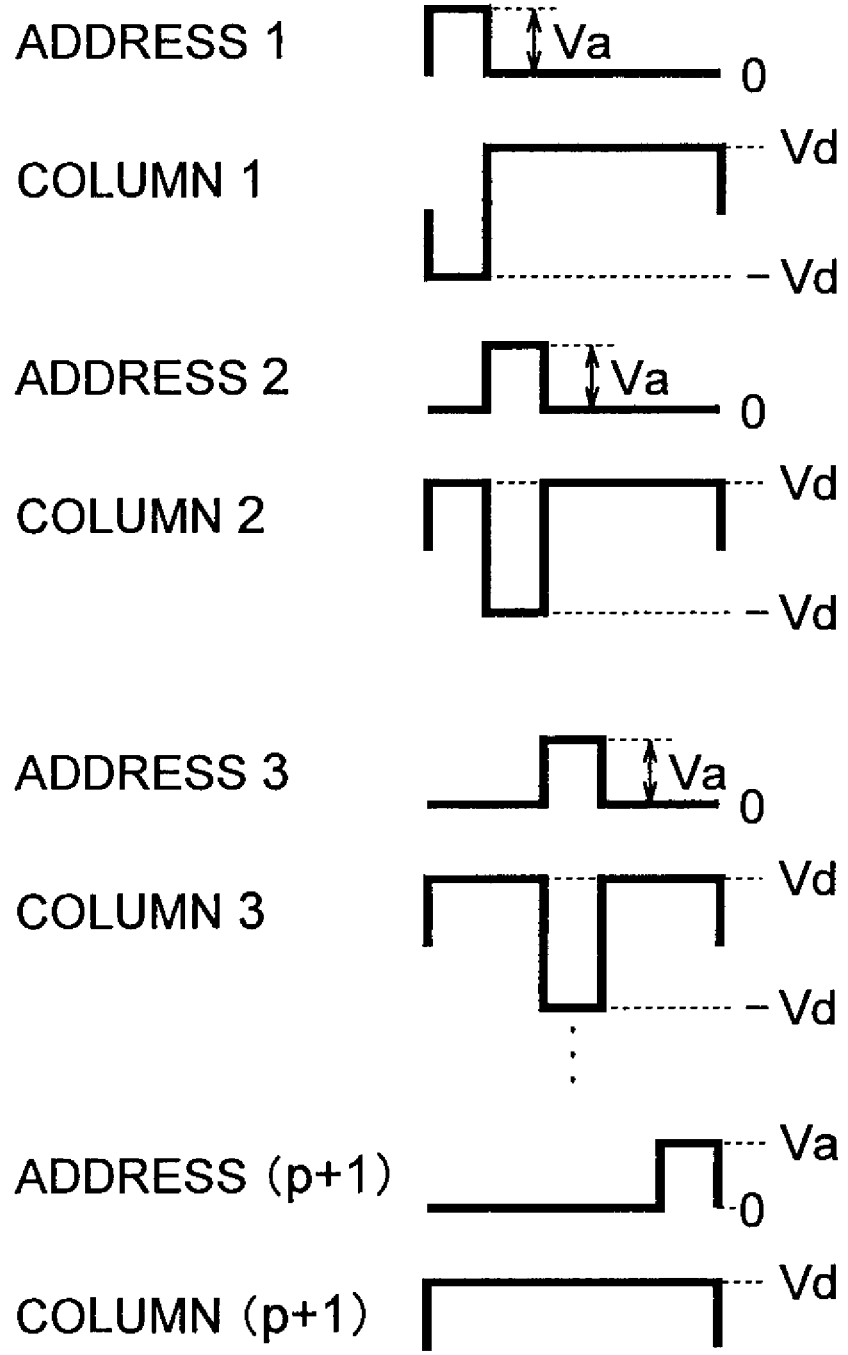
FIG. 21 is a drive waveform diagram in the case where there are p windows which display a three-dimensional image in a background of two-dimensional image display.

A concrete example of drive waveforms applied to address lines and column signal lines at this time is shown in FIG. 21. Address 1 to address p respectively indicate voltage waveforms applied to address lines which overlap the first window to the pth window. When selected, a voltage Va is applied. Otherwise, a voltage of 0 V is applied. Column 1 to column p respectively indicate voltage waveforms applied to column signal lines which overlap the first window to the pth window. When selected, a voltage −Vd is applied. Otherwise, a voltage of +Vd is applied. Since the address voltage is always applied, drive at the maximum contrast of average voltage drive should be conducted. It is now supposed that the threshold voltage is Vth and there are n waveforms for the address line. According to the document ("The foundation of liquid crystal and display application" written by Y. Yoshino and M. Ozaki published by CORONA PUBLISHING CO., LTD), the contrast is maximized, i.e., the polarization selection ratio is maximized by providing Va and Vd with values according to the following expressions.

$$V_a = \frac{V_{th}}{\sqrt{2}} \sqrt{\frac{1}{1 - \sqrt{\frac{1}{n}}}} \qquad (26)$$

$$V_d = \sqrt{n} \, V_a \qquad (27)$$

Drive Waveforms in Case where there are p Two-Dimensional Image Display Windows

Figure 22:
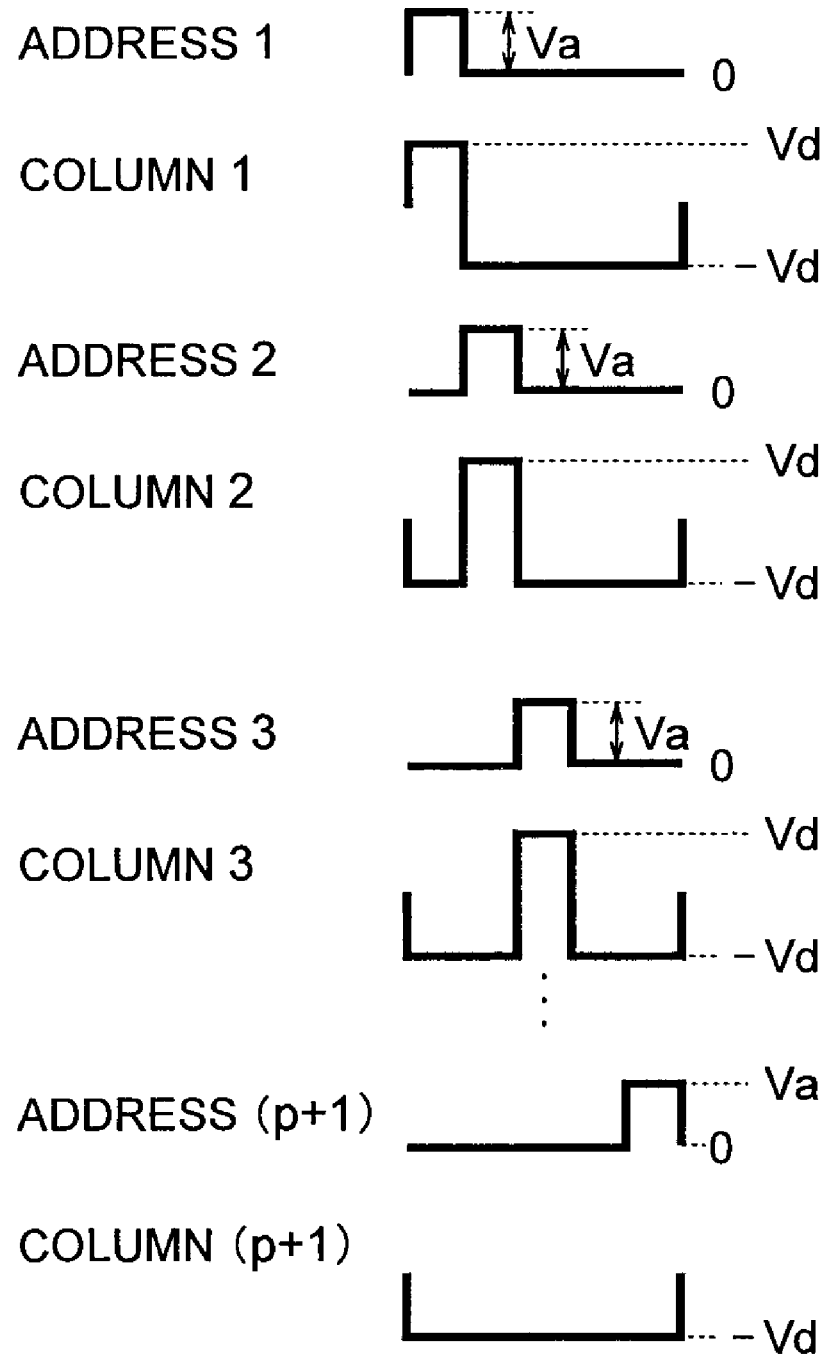
FIG. 22 is a drive waveform diagram in the case where there are p windows which display a two-dimensional image in a background of three-dimensional image display.

A concrete example of waveforms in the case where there is a window of two-dimensional image display in a background of a three-dimensional image is shown in FIG. 22. As shown in FIG. 22, address voltages are the same as those shown in FIG. 21 and column voltages have waveforms obtained by inverting the column voltages shown in FIG. 21. Comparing FIG. 9 with FIG. 19, there is a difference as to whether the window is three-dimensional image display (bit 1) or two-dimensional image display (bit 0). In the case where there are p two-dimensional image display windows on a background of three-dimensional image display, therefore, the flag bit w1 becomes "0" in the first to pth address drive waveforms included in address line drive waveforms, whereas the flag bit w1 becomes "1" in the (p+1)-th address drive waveform.

On the other hand, in the case where there is a window of three-dimensional image display on a background of high definition two-dimensional image, the flag bit w1 becomes "1" in the first to pth address drive waveforms, whereas the flag bit w1 becomes "0" in the (p+1)-th address drive waveform.

Figure 23:
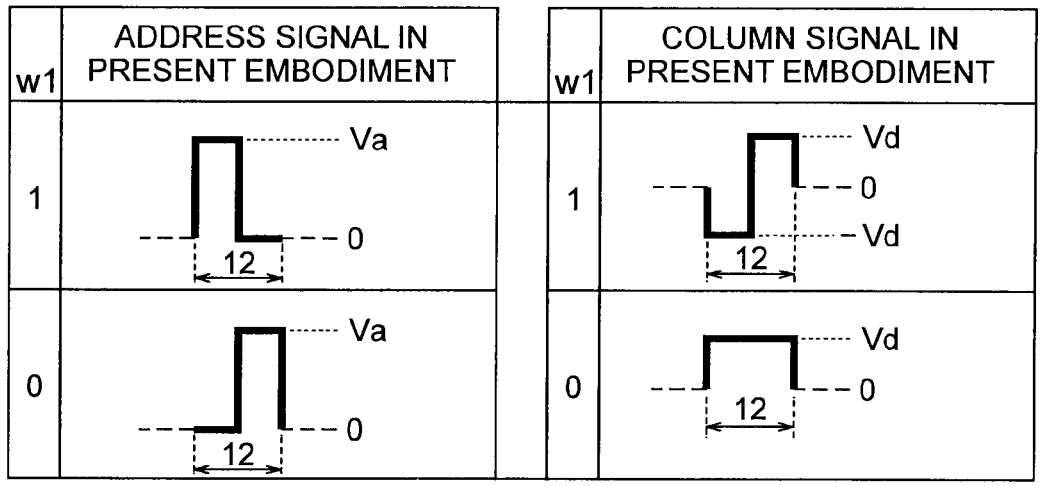
FIG. 23 is a drive waveform diagram in the case where there is one window which displays a three-dimensional image in a background of two-dimensional image display.

In the present embodiment, drive waveforms in the case where there is one window of three-dimensional image display on a background of a high definition two-dimensional image are shown in FIG. 23.

Figure 24:
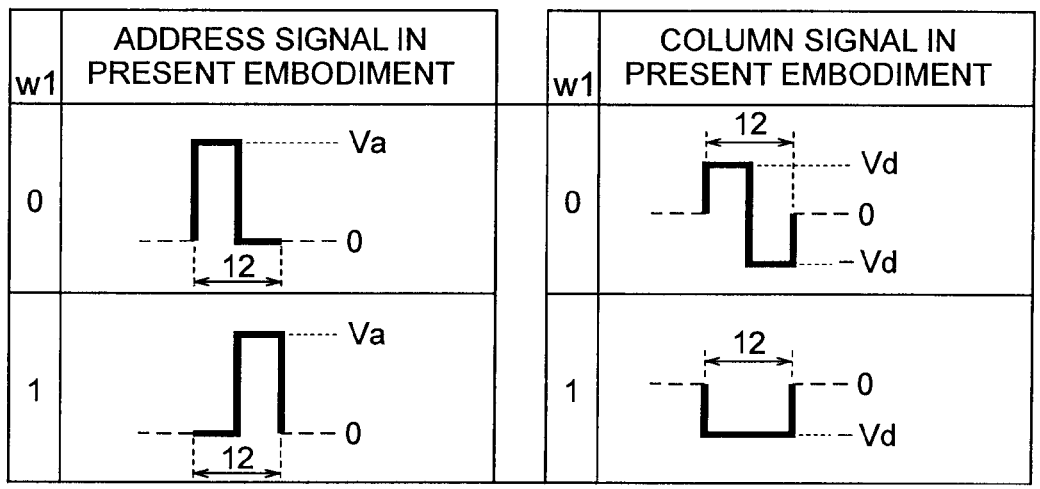
FIG. 24 is a drive waveform diagram in the case where there is one window which displays a two-dimensional image in a background of three-dimensional image display.

In the present embodiment, drive waveforms in the case where there is one window of two-dimensional image display on a background of three-dimensional image display are shown in FIG. 24.

Va and Vd of the liquid crystal having the V-T curve shown in FIG. 2 at the time when there are n address drive waveforms are calculated by using Expression 26 and Expression 27.

And a voltage applied to the liquid crystal on an average is calculated. A result is shown in FIG. 25. Even in the case where the difference between Va and Vd is small so as to satisfy the relation Va−Vd<Vd, the case where there is a window of three-dimensional image display on high definition two-dimensional image display, and the case where Va is applied to a plurality of pulses in address lines, partial three-dimensional image display free from display degradation can be conducted. If Vd has the same polarity as Va, i.e., the column drive waveform is OFF regardless of whether the voltage is 0 V or Va in the address drive waveform, then the voltage applied to the liquid crystal becomes the threshold voltage or below resulting in an unselected state. On a line which overlap both the window 1 and the window 2, the applied voltage becomes Va in both the former half and the latter half of the frame. In the case of non-selection in the column waveform (the two-dimensional image display mode and the flag bit is "0"), the voltage applied to the liquid crystal becomes the threshold voltage or below.

Figure 26:
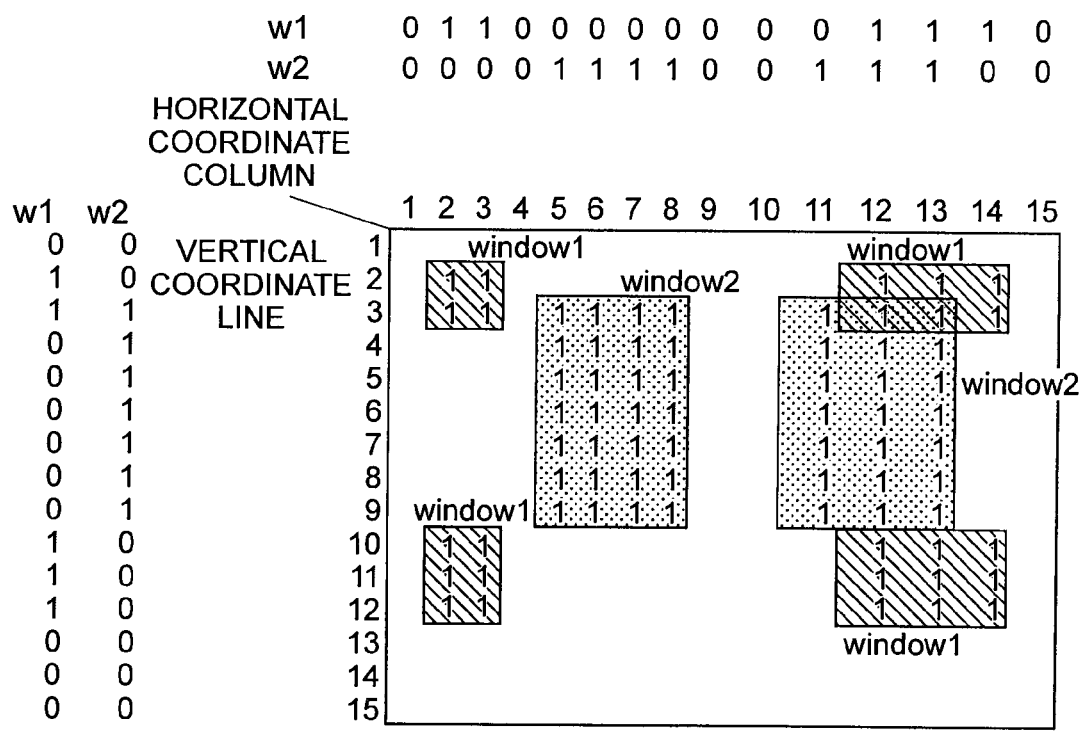
FIG. 26 is a diagram for explaining the case where a plurality of windows are disposed in a lattice form.

If the kth window which changes the polarization direction exists on a certain line and the kth window exists on the same column lines on the certain line, the lines or the columns are made not to be adjacent areas but be discrete. As a result, a plurality of windows is formed in a grating form. An example of distribution of windows on the variable polarization cell 4 in this case is shown in FIG. 26.

When displaying a 3D display window in one place in a 2D display window, flags 1 of windows 1 are typically set consecutively only in a certain range of the address lines and column lines. As indicated by windows 1 in FIG. 26, it is also possible to set flags 1 of windows 1 so as to be divided into a plurality of places and consecutive only in certain ranges. In that case, in places where flags of address lines and column lines are set to 1 in areas of the window 1, a part in which the logical product of an address line and a column line is 1 becomes 3D display. For example, if flags of each of address lines and column lines are set to 1 in two places, 3D display of 2×2=4 windows becomes possible.

Figure 27:
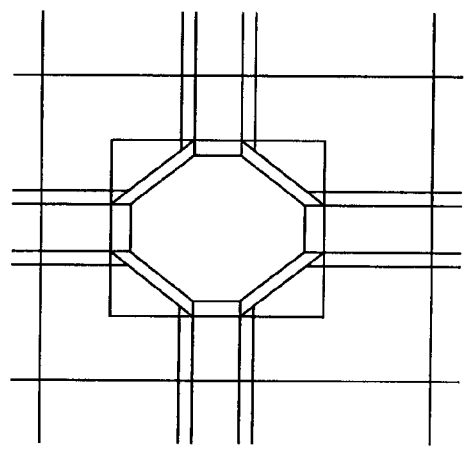
FIG. 27 is a diagram showing a shape of an electrode for forming an arbitrary window shape.

The simple matrix drive is effective in a rectangular window. In a window having an arbitrary shape such as an ellipse or a rhombus, the number and positions of pixels used for three-dimensional image display are not determined uniquely in a window of each address line. Therefore, the number pf address drive waveforms becomes large, and the ON/OFF voltage ratio, i.e., the polarization selection ratio becomes small, resulting in degraded three-dimensional image display. If an area where a three-dimensional image is to be displayed is predetermined, therefore, it becomes possible to display a window of an arbitrary shape by providing the transparent electrode with a shape of an ellipse or a rhombus beforehand as shown in FIG. 27.

According to the embodiments of the present invention, it becomes possible to prevent luminance falling and moire occurrence and change over between a two-dimensional image and a three-dimensional image partially.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A drive method for a stereoscopic image display apparatus, the stereoscopic image display apparatus including:
  a plane display device having a plurality of pixels arranged on a display face;
  a variable polarization cell provided in front of the plane display device, the variable polarization cell including a first electrode substrate having n (where n≧1) transparent first electrodes arranged in parallel thereon, a second electrode substrate having m (where m≧1) transparent second electrodes arranged in a direction substantially perpendicular to the direction in which the first electrodes are arranged, and liquid crystal sandwiched between the first electrode substrate and the second electrode substrate, wherein a polarization direction of light rays from the plane display device is made variable according to a voltage applied between the first and second electrode substrates; and
  an optical plate provided on an opposite side of the variable polarization cell from the plane display device, the optical plate including a transparent substrate, a lens substrate having a plurality of cylindrical lenses arranged thereon so as to have major axes in the same direction, and a double refraction substance inserted between the transparent substrate and the lens substrate, wherein a major axis direction of the double refraction substance is substantially parallel to major axis directions of lenses of the lens substrate, a minor axis direction of the double refraction substance is substantially perpendicular to the major axis directions of the lenses of the lens substrate, and light rays from the pixels obtained via the variable polarization cell are assigned to predetermined angles,
  the stereoscopic image display apparatus being capable of changing over between a three-dimensional image and a two-dimensional image and displaying the image,
  when displaying the three-dimensional image and the two-dimensional image in a background and a window on a same display plane, the background with one of the three-dimensional image and the two-dimensional image and displaying a first to pth (where p≧1) windows with the other image, the drive method comprising:
  setting an ith flag bit (where 1≦i≦p) concerning the first electrodes and indicating whether an ith window overlaps the first electrodes, and setting an ith flag bit concerning the second electrodes and indicating whether the ith window overlaps the second electrodes;
  dividing one frame period of the plane display device into p sections as first and second pulses of voltage to be applied respectively to the first and second electrodes, preparing waveforms of $2^p$ kinds which differ in at least one value of the first and second pulses in the section obtained by the division, and associating the waveforms with a set of values of the first to pth flag bits concerning the first and second electrodes;
  selecting one first electrode and one second electrode respectively from the n first electrodes and the m second electrodes; and
  applying the first and second pulses associated with the set of values of the first to pth flag bits concerning the selected first and second electrodes to the selected first and second electrodes.

2. The method according to claim 1, wherein
  the liquid crystal of the variable polarization cell is TN liquid crystal, and denoting a voltage at which a director of the liquid crystal begins to rise by Vth and a voltage at time when the liquid crystal has risen 95% by Vsat, a relation Vsat<Vth×3 is satisfied,
  when performing two-dimensional image display on the background and the number of the windows which perform three-dimensional image display is one, voltages of Vth×2 and −Vth×2 are alternately applied to the first electrodes overlapping the window, and voltage of 0 V is applied to the first electrodes which do not overlap the window, and voltages of Vth and −Vth are alternately applied to the second electrodes overlapping the window, and voltages of −Vth and Vth are alternately applied to the second electrodes which do not overlap the window.

3. The method according to claim 1, wherein the liquid crystal of the variable polarization cell is TN liquid crystal, and denoting a voltage at which a director of the liquid crystal begins to rise by Vth and a voltage at time when the liquid crystal has risen 95% by Vsat, a relation Vsat<Vth×3 is satisfied, when performing three-dimensional image display on the background and the number of the windows which perform two-dimensional image display is one, voltages of −Vth/2 and Vth/2 are alternately applied to the first electrodes overlapping the window, and voltages of −(Vsat−Vth/2) and (Vsat−Vth/2) are alternately applied to the first electrodes which do not overlap the window, and voltages of Vth/2 and −Vth/2 are alternately applied to the second electrodes overlapping the window, and voltages of −(Vsat−Vth/2) and (Vsat−Vth/2) are alternately applied to the second electrodes which do not overlap the window.

4. The method according to claim 1, wherein the liquid crystal of the variable polarization cell is TN liquid crystal, and a voltage at which a director of the liquid crystal begins to rise is denoted by Vth (V), when two-dimensional image display is performed on the background and the windows which perform three-dimensional image display are first and second windows, a voltage of 2×Vth is applied to the first electrodes which overlap only the first window over a former half of the one frame and a voltage of 0 V is applied to the first electrodes which overlap only the first window over a latter half of the one frame, a voltage of 0 V is applied to the first electrodes which overlap only the second window over a former half of the one frame and a voltage of 2×Vth is applied to the first electrodes which overlap only the second window over a latter half of the one frame, a voltage of 2×Vth is applied to the first electrodes which overlap both the first and second windows over both the former half and the latter half of the one frame, a voltage of 0 V is applied to the first electrodes which overlap neither the first nor the second windows over both the former half and the latter half of the one frame, a voltage of −Vth is applied to the second electrodes which overlap only the first window over a former half of the one frame and a voltage of Vth is applied to the second electrodes which overlap only the first window over a latter half of the one frame, a voltage of Vth is applied to the second electrodes which overlap only the second window over a former half of the one frame and a voltage of −Vth is applied to the second electrodes which overlap only the second window over a latter half of the one frame, a voltage of −Vth is applied to the second electrodes which overlap both the first and second windows over both the former half and the latter half of the one frame, and a voltage of Vth is applied to the second electrodes which overlap neither the first nor the second windows over both the former half and the latter half of the one frame.

5. The method according to claim 1, wherein the liquid crystal of the variable polarization cell is TN liquid crystal, a voltage at which a director of the liquid crystal begins to rise is denoted by Vth (V), and a voltage at which the liquid crystal has risen to 95% is denoted by Vsat, when three-dimensional image display is performed on the background and the windows which perform two-dimensional image display are first and second windows, a voltage of 0 V is applied to the first electrodes which overlap only the first window over a former half of the one frame and a voltage of 2×Vth is applied to the first electrodes which overlap only the first window over a latter half of the one frame, a voltage of 2×Vth is applied to the first electrodes which overlap only the second window over a former half of the one frame and a voltage of 0 V is applied to the first electrodes which overlap only the second window over a latter half of the one frame, a voltage of 0 V is applied to the first electrodes which overlap both the first and second windows over both the former half and the latter half of the one frame, a voltage of Vsat+Vth is applied to the first electrodes which overlap neither the first nor the second windows over both the former half and the latter half of the one frame, a voltage of −Vth is applied to the second electrodes which overlap only the first window over a former half of the one frame and a voltage of Vth is applied to the second electrodes which overlap only the first window over a latter half of the one frame, a voltage of Vth is applied to the second electrodes which overlap only the second window over a former half of the one frame and a voltage of −Vth is applied to the second electrodes which overlap only the second window over a latter half of the one frame, a voltage of Vth is applied to the second electrodes which overlap both the first and second windows over both the former half and the latter half of the one frame, and a voltage of −(Vsat+Vth) is applied to the second electrodes which overlap neither the first nor the second windows over both the former half and the latter half of the one frame.

6. The method according to claim 2, wherein when sheet polarizers which differ in polarization direction by 90 degrees are placed on both sides of the variable polarization cell, the voltage Vth is measured as a threshold voltage at which transmittance from one of the sheet polarizers to the other becomes 90%, and when sheet polarizers which differ in polarization direction by 90 degrees are placed on both sides of the variable polarization cell, the voltage Vsat is measured as a voltage at which transmittance from one of the sheet polarizers to the other becomes 2%.

7. A drive method for a stereoscopic image display apparatus, the stereoscopic image display apparatus including:

a plane display device having a plurality of pixels arranged on a display face;

a variable polarization cell provided in front of the plane display device, the variable polarization cell including a first electrode substrate having n (where p≧1) transparent first electrodes arranged in parallel thereon, a second electrode substrate having m (where m≧1) transparent second electrodes arranged in a direction substantially perpendicular to the direction in which the first electrodes are arranged, and TN liquid crystal sandwiched between the first electrode substrate and the second electrode substrate, wherein a polarization direction of light rays from the plane display device is made variable according to a voltage applied between the first and second electrode substrates; and an optical plate provided on an opposite side of the variable polarization cell from the plane display device, the optical plate including a transparent substrate, a lens substrate having a plurality of cylindrical lenses arranged thereon so as to have major axes in the same direction, and a double refraction substance inserted between the transparent substrate and the lens substrate, wherein a major axis direction of the double refraction substance is substantially parallel to major axis directions of lenses of the lens substrate, a minor axis direction of the double refraction substance is substantially perpendicular to the major axis directions of the lenses of the lens substrate, and light rays from the pixels obtained via the variable polarization cell are assigned to predetermined angles, the stereoscopic image display apparatus being capable of changing over between a three-dimensional image and a two-dimensional image and displaying the image, when displaying the three-dimensional image and the two-dimensional image in a background and a window on a same display plane, the background with one of the three-dimensional image and the two-dimensional image and displaying a first to pth (where $p \geq 1$) windows with the other image, the drive method comprising:

dividing one frame period of the plane display device into (p+1) sections, applying a pulse of a voltage Va (where Va>0) to all first electrodes which overlap the kth window as a first pulse to be applied to the first electrodes in the kth section (where $1 \leq k \leq p$) in the first to (p+1)th sections obtained by the division, applying a pulse of a voltage −Vd (where Vd>0) to all second electrodes which overlap the kth window as a second pulse to be applied to the second electrodes in the kth section, applying a pulse of a maximum voltage Va to the first electrodes which do not overlap any window as a first pulse in the (p+1)th section, and applying a pulse of a voltage Vd to the second electrodes which do not overlap any window as a second pulse in the (p+1)th section.

8. The method according to claim 7, wherein the voltage Va and the voltage Vd satisfy the following expressions.

$$V_a = \frac{V_{th}}{\sqrt{2}} \sqrt{\frac{1}{1 - \sqrt{\frac{1}{n}}}}$$

$$V_d = \sqrt{n}\, V_a$$

* * * * *